(12) United States Patent
Kamba

(10) Patent No.: US 11,399,127 B2
(45) Date of Patent: Jul. 26, 2022

(54) IMAGING APPARATUS AND METHOD FOR CONTROLLING THE SAME

(71) Applicant: CANON KABUSHIKI KAISHA, Tokyo (JP)

(72) Inventor: Masaki Kamba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/795,342

(22) Filed: Feb. 19, 2020

(65) Prior Publication Data

US 2020/0275014 A1 Aug. 27, 2020

(30) Foreign Application Priority Data

Feb. 27, 2019 (JP) .............................. JP2019-034281
Jan. 22, 2020 (JP) .............................. JP2020-008774

(51) Int. Cl.
*H04N 5/232* (2006.01)
*G02B 7/28* (2021.01)

(52) U.S. Cl.
CPC ......... *H04N 5/23212* (2013.01); *G02B 7/282* (2013.01); *H04N 5/23296* (2013.01)

(58) Field of Classification Search
CPC ........... H04N 5/23212; H04N 5/23296; H04N 5/23218; H04N 5/232123; G02B 7/282
See application file for complete search history.

(56) References Cited

U.S. PATENT DOCUMENTS

| 5,815,203 A | 9/1998 | Lee |
| 5,895,129 A | 4/1999 | Ohta |
| 2010/0178045 A1* | 7/2010 | Hongu ............. H04N 5/232123 396/80 |
| 2013/0308932 A1* | 11/2013 | Nagao ................... G02B 7/102 396/125 |
| 2014/0168383 A1 | 6/2014 | Murakami |
| 2017/0264812 A1* | 9/2017 | Kamba ............. H04N 5/23212 |

(Continued)

FOREIGN PATENT DOCUMENTS

| CN | 1101476 A | 4/1995 |
| CN | 101776835 A | 7/2010 |
| CN | 103424954 A | 12/2013 |

(Continued)

*Primary Examiner* — Timothy J Henn
(74) *Attorney, Agent, or Firm* — Canon U.S.A., Inc. IP Division

(57) ABSTRACT

An imaging apparatus includes an image sensor, a storage unit configured to store track data indicating a positional relationship between a zoom lens and a focus lens when an imaging optical system focuses at a predetermined subject distance, an adjustment value acquisition unit configured to acquire adjustment values for adjusting the track data, and a focus control unit configured to control a drive of the focus lens based on the track data and the adjustment values acquired by an adjustment value acquisition unit at a time of a zoom operation. The adjustment value acquisition unit selects adjustment value acquisition processing to be performed from a plurality of pieces of adjustment value acquisition processing, based on the track data, a position of the zoom lens, and a position of the focus lens, and acquires the adjustment values based on the selected adjustment value acquisition processing.

18 Claims, 23 Drawing Sheets

(56) References Cited

U.S. PATENT DOCUMENTS

2018/0063412 A1\* 3/2018 Uenishi .............. H04N 5/23212
2018/0217352 A1\* 8/2018 Kamba ............ H04N 5/232123

FOREIGN PATENT DOCUMENTS

| | | |
|---|---|---|
| CN | 104219581 A | 12/2014 |
| JP | H11 23933 A | 1/1999 |
| JP | 2000-261709 A | 9/2000 |
| JP | 2005 128107 A | 5/2005 |
| JP | 2014-228695 A | 12/2014 |
| JP | 2017-037103 A | 2/2017 |
| WO | 2013/055737 A1 | 4/2013 |

\* cited by examiner

FIG.11
[ENTIRE IMAGE]
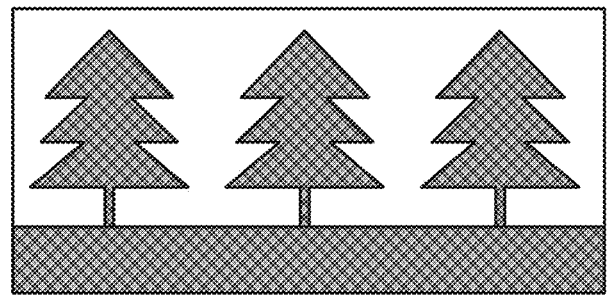
[PARTIAL IMAGES]
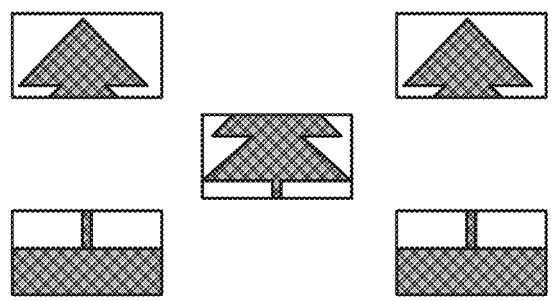

FIG.20

| | PAN 0 | PAN 1 | ... | PAN (X-1) | PAN X |
|---|---|---|---|---|---|
| TILT 0 | EVALUATION VALUE (0, 0) SUBJECT DISTANCE (0, 0) | EVALUATION VALUE (1, 0) SUBJECT DISTANCE (1, 0) | ... | EVALUATION VALUE (X-1, 0) SUBJECT DISTANCE (X-1, 0) | EVALUATION VALUE (X, 0) SUBJECT DISTANCE (X, 0) |
| TILT 1 | EVALUATION VALUE (0, 1) SUBJECT DISTANCE (0, 1) | EVALUATION VALUE (1, 1) SUBJECT DISTANCE (1, 1) | ... | EVALUATION VALUE (X-1, 1) SUBJECT DISTANCE (X-1, 1) | EVALUATION VALUE (X, 1) SUBJECT DISTANCE (X, 1) |
| ... | ... | ... | ... | ... | ... |
| TILT (Y-1) | EVALUATION VALUE (0, Y-1) SUBJECT DISTANCE (0, Y-1) | EVALUATION VALUE (1, Y-1) SUBJECT DISTANCE (1, Y-1) | ... | EVALUATION VALUE (X-1, Y-1) SUBJECT DISTANCE (X-1, Y-1) | EVALUATION VALUE (X, Y-1) SUBJECT DISTANCE (X, Y-1) |
| TILT Y | EVALUATION VALUE (0, Y) SUBJECT DISTANCE (0, Y) | EVALUATION VALUE (1, Y) SUBJECT DISTANCE (1, Y) | ... | EVALUATION VALUE (X-1, Y) SUBJECT DISTANCE (X-1, Y) | EVALUATION VALUE (X, Y) SUBJECT DISTANCE (X, Y) |

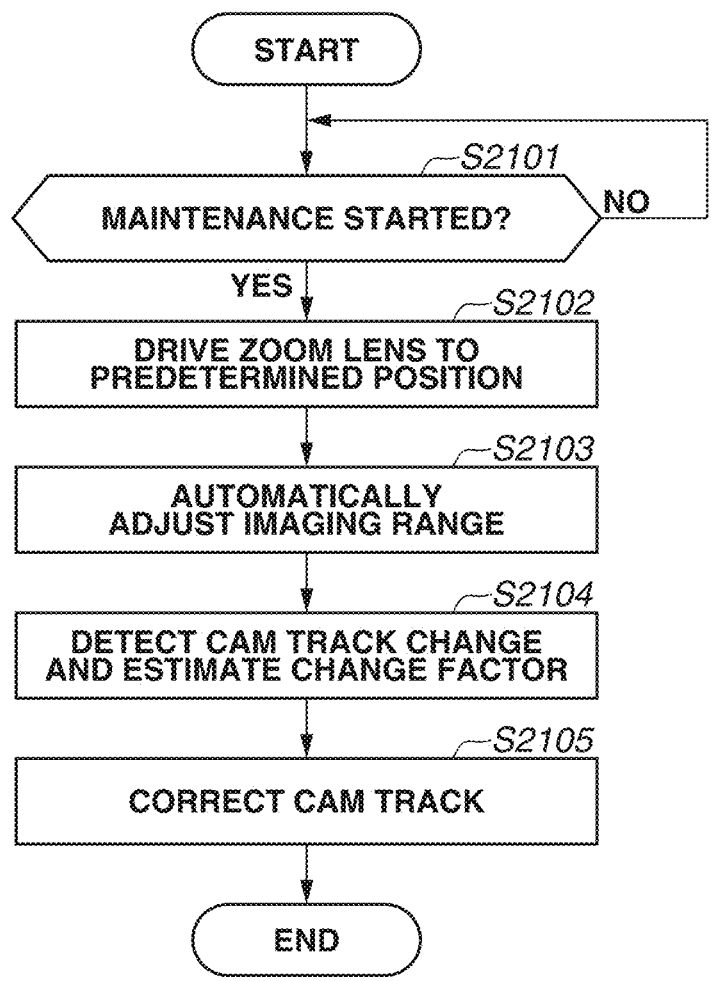

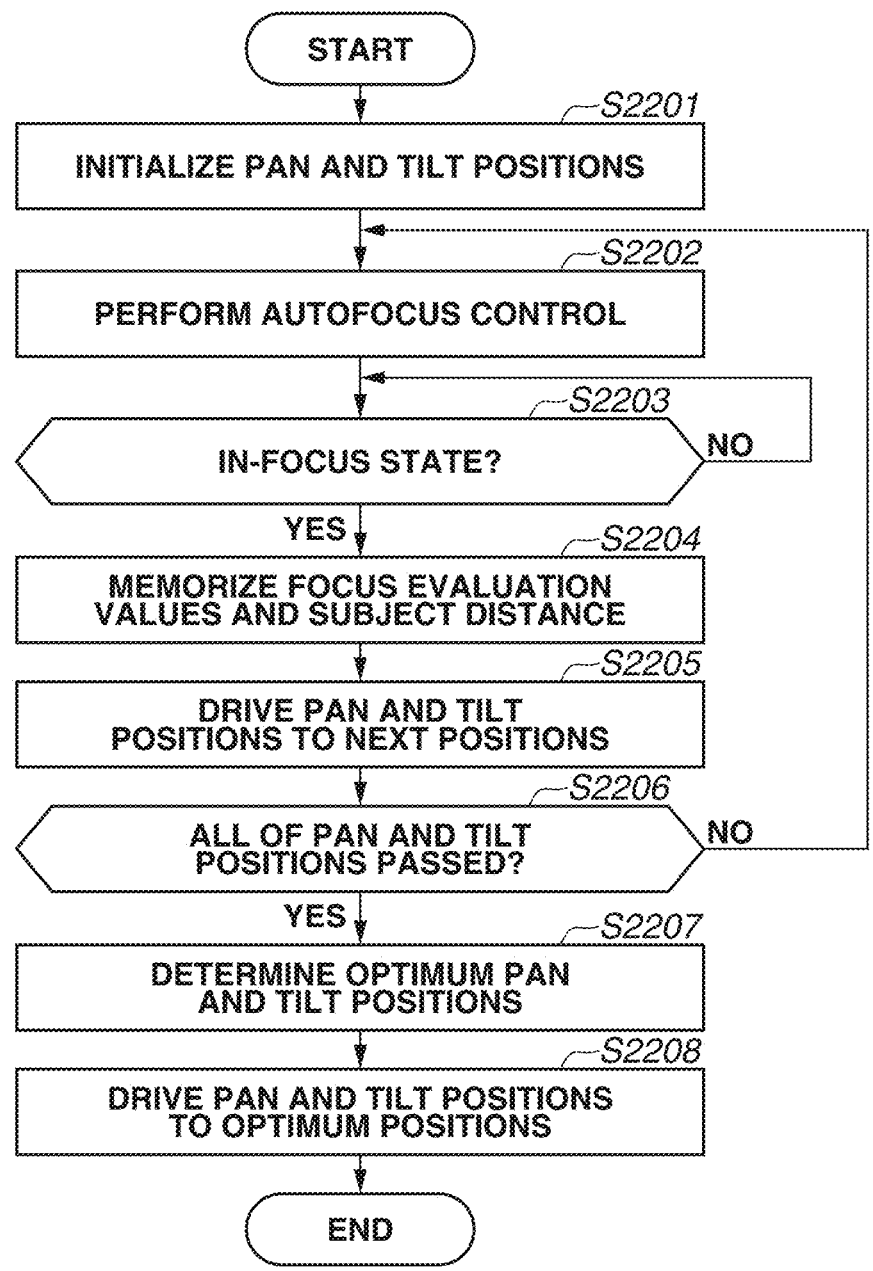

IMAGING APPARATUS AND METHOD FOR CONTROLLING THE SAME

BACKGROUND OF THE INVENTION

Field of the Invention

The present invention relates to an imaging apparatus and a method for controlling the imaging apparatus. More particularly, the present invention relates to an imaging apparatus for moving a focus lens in association with the movement of a zoom lens, and a method for controlling the image apparatus.

Description of the Related Art

Many of conventional video cameras perform what is called a zoom tracking operation in a zooming operation using a zoom lens. In the zoom tracking operation, a focus lens is moved to correct the imaging plane movement accompanying the zoom lens movement, thus maintaining the in-focus state. The zoom tracking operation is performed by moving the focus lens position along a cam track curve (track data) stored in memory.

Only using the above-described track data will cause errors between a cam track design value and an in-focus position during the actual operation because of individual variations of the lens barrel. For this reason, the tracking adjustment for adjusting errors is performed for each imaging apparatus at the time of shipment. In the tracking adjustment, reference positions of the zoom and the focus lenses in the track data are stored as adjustment values.

If shock, vibration, aging, or sudden temperature variations is applied to the lens barrel, position changes occur in detection sensors (photointerrupters (PIs)) for detecting the positions of the imaging optical system, image sensor, zoom lens, and focus lens. These position changes may change the positional relationship between the zoom and the focus lenses with which the in-focus state is obtained, from the adjusted track data. This may cause a degradation of the focusing accuracy at the time of a zooming operation.

Japanese Patent Application Laid-Open No. 2014-228695 discusses a method for correcting back focus adjustment values based on a variation from a focus lens reference position when a predetermined condition is satisfied.

The present invention is directed to a method for adjusting track data by using a method different from the method disclosed in Japanese Patent Application Laid-Open No. 2014-228695.

SUMMARY OF THE INVENTION

According to an aspect of the present invention, an imaging apparatus includes an image sensor configured to photoelectrically convert a subject image obtained through an imaging optical system including a zoom lens and a focus lens, a storage unit configured to store track data indicating a positional relationship between the zoom and the focus lenses when the imaging optical system focuses at a predetermined subject distance, an adjustment value acquisition unit configured to acquire adjustment values for adjusting the track data, and a focus control unit configured to control a drive of the focus lens based on the track data and the adjustment values acquired by the adjustment value acquisition unit at the time of a zoom operation, wherein the adjustment value acquisition unit selects adjustment value acquisition processing to be performed from a plurality of pieces of adjustment value acquisition processing based on the track data, the zoom lens position, and the focus lens position, and acquires adjustment values based on the selected adjustment value acquisition processing.

Further features of the present invention will become apparent from the following description of exemplary embodiments with reference to the attached drawings.

BRIEF DESCRIPTION OF THE DRAWINGS

FIG. 11 illustrates examples of field angle difference information according to the second exemplary embodiment of the present invention.

FIG. 20 illustrates an example of a data table handled in automatic field angle setting according to the fourth exemplary embodiment of the present invention.

FIG. 21 is a flowchart illustrating maintenance mode control according to the fourth exemplary embodiment of the present invention.

FIG. 22 is a flowchart illustrating field angle adjustment control according to the fourth exemplary embodiment of the present invention.

DESCRIPTION OF THE EMBODIMENTS

Figure 1:
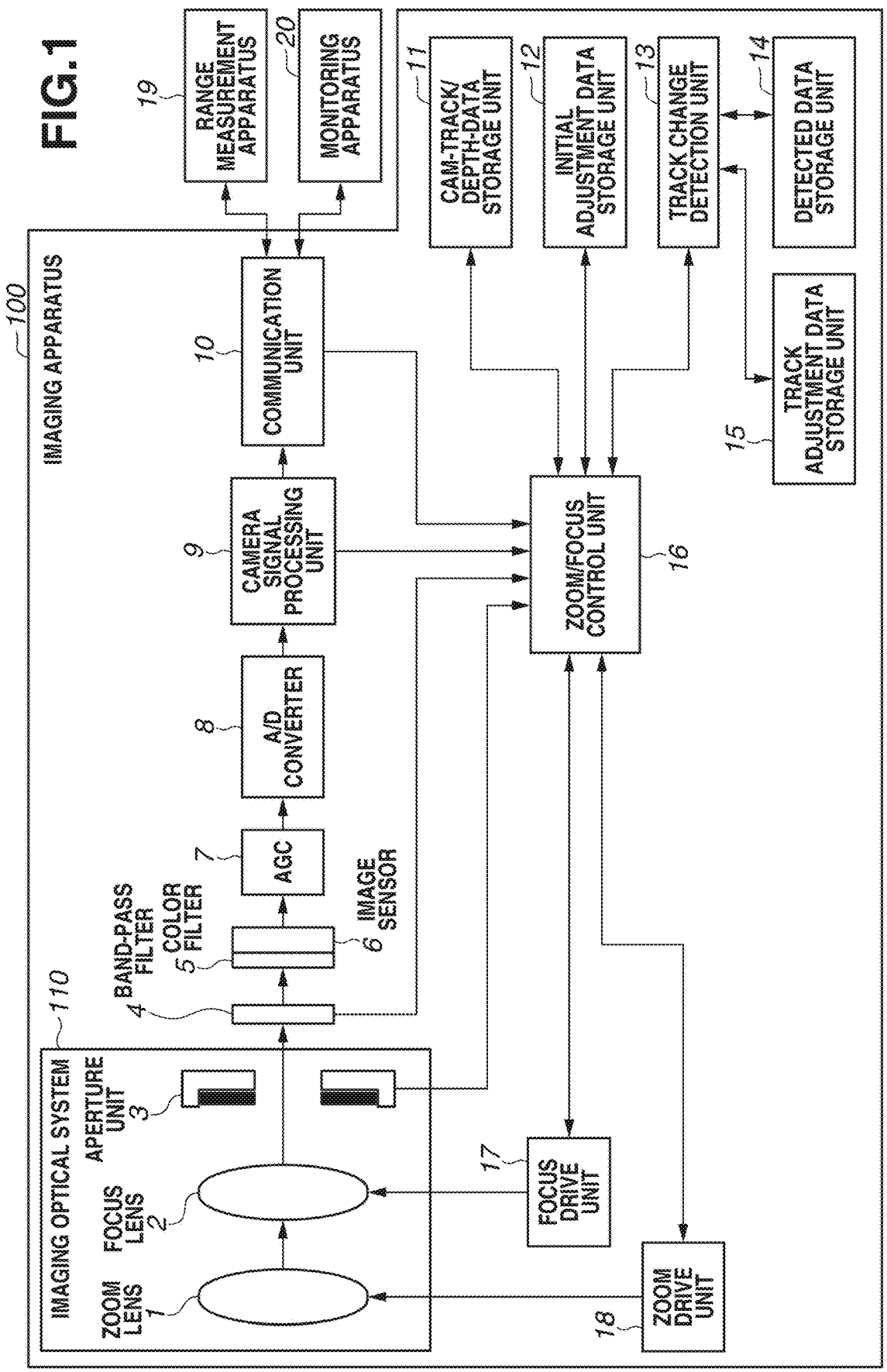
FIG. 1 is a block diagram illustrating a configuration of an imaging apparatus according to a first exemplary embodiment of the present invention.

The technique discussed in Japanese Patent Application Laid-Open No. 2014-228695 is back focus adjustment, which makes it possible to correct changes of a lens barrel affecting the position of the image sensor and the focus lens reference position. However, changes of an imaging optical system affecting the shape of track data and changes affecting the zoom lens reference position cannot be corrected. If the in-focus position of the focus lens changes since the reference position of the imaging optical system or the zoom lens changes, even if the focus lens reference position is corrected, changing the zoom position causes a defocus state again. Accordingly, the inventor found that zoom tracking cannot be correctly performed resulting in a deviated field angle. More specifically, the method discussed in Japanese Patent Application Laid-Open No. 2014-228695 is unable to cope with the focusing accuracy degradation during zooming, depending on the cause of the difference between the actual in-focus position and the in-focus position indicated by the track data. Exemplary embodiments will be described below centering on an imaging apparatus capable of reducing the focusing accuracy degradation during zooming even if the stored track data deviates from the actual in-focus position because of various factors.

Exemplary embodiments of the present invention will be described in detail below with reference to the accompanying drawings. In the following drawings, identical members are assigned the same reference numerals, and duplicated descriptions thereof will be omitted. Each of the exemplary embodiments of the present invention described below can be implemented solely or as a combination of a plurality of the exemplary embodiments or features thereof where necessary or where the combination of elements or features from individual exemplary embodiments in a single exemplary embodiment is beneficial.

A first exemplary embodiment estimates how the actual in-focus position deviates from the stored track data based on the stored track data, the positions of the zoom and the focus lenses, and the actual in-focus level at these positions. Then, the first exemplary embodiment selects an adjustment value acquisition method based on the result of the estimation. For example, the first exemplary embodiment estimates whether the curve generated by plotting the actual in-focus position in terms of the zoom and the focus lens positions, like the track data, becomes a curve offset with respect to the track data or a curve having a different shape (curvature and inclination) from the curve indicated by the track data. When the curve is estimated to become an offset curve, the first exemplary embodiment selects an acquisition method for acquiring adjustment values based on the offset value. When the curve is estimated to become a curve having a different shape, the first exemplary embodiment selects a method for setting different adjustment values for each position of the zoom lens. An example of a method for using the subject distance instead of the in-focus level will also be described below.

FIG. 1 is a block diagram illustrating a configuration of an imaging apparatus 100 according to the first exemplary embodiment. The imaging apparatus 100 according to the present exemplary embodiment include an imaging optical system 110.

The imaging optical system 110 includes a plurality of optical elements and forms an optical image of an object (subject). The imaging optical system 110 according to the present exemplary embodiment includes a zoom lens 1 (magnification varying lens) moving in the optical axis direction to change the focal length, a focus lens 2 moving in the optical axis direction to perform focus adjustment, and an aperture unit 3 for adjusting the light amount. Although, in FIG. 1, the imaging optical system 110 includes one zoom lens 1 and one focus lens 2, the imaging optical system 110 may include a plurality of the zoom lenses 1 and a plurality of the focus lenses 2.

An optical image formed by the imaging optical system 110 is photoelectrically converted by an image sensor 6 via a band-pass filter 4 (hereinafter referred to as a BPF 4) and a color filter 5. Although not illustrated in FIG. 1, optical elements such as the BPF 4 are configured to be retractable from the optical path of the imaging optical system 110.

An electrical signal (video signal) output from the image sensor 6 is adjusted in gain by an automatic gain control unit (AGC) 7, undergoes analog-to-digital (A/D) conversion by an A/D converter 8, and then is input to a camera signal processing unit 9. The camera signal processing unit 9 performs various kinds of image processing on the signal, outputs the processed signal as a video signal to a communication unit 10, and calculates the evaluation value necessary for an autofocus operation from the video signal.

A cam-track/depth-data storage unit 11 includes a memory for storing the track data corresponding to a plurality of subject distances and acquires the track data to be used for the zoom tracking operation, based on the stored track data and the current positions of the focus and the zoom lenses. The track data to be used for the zoom tracking operation includes cam track data corresponding to the current subject distance and the current positions of the focus and the zoom lenses. The cam-track/depth-data storage unit 11 also acquires depth-of-field information corresponding to the zoom position.

Figure 2:
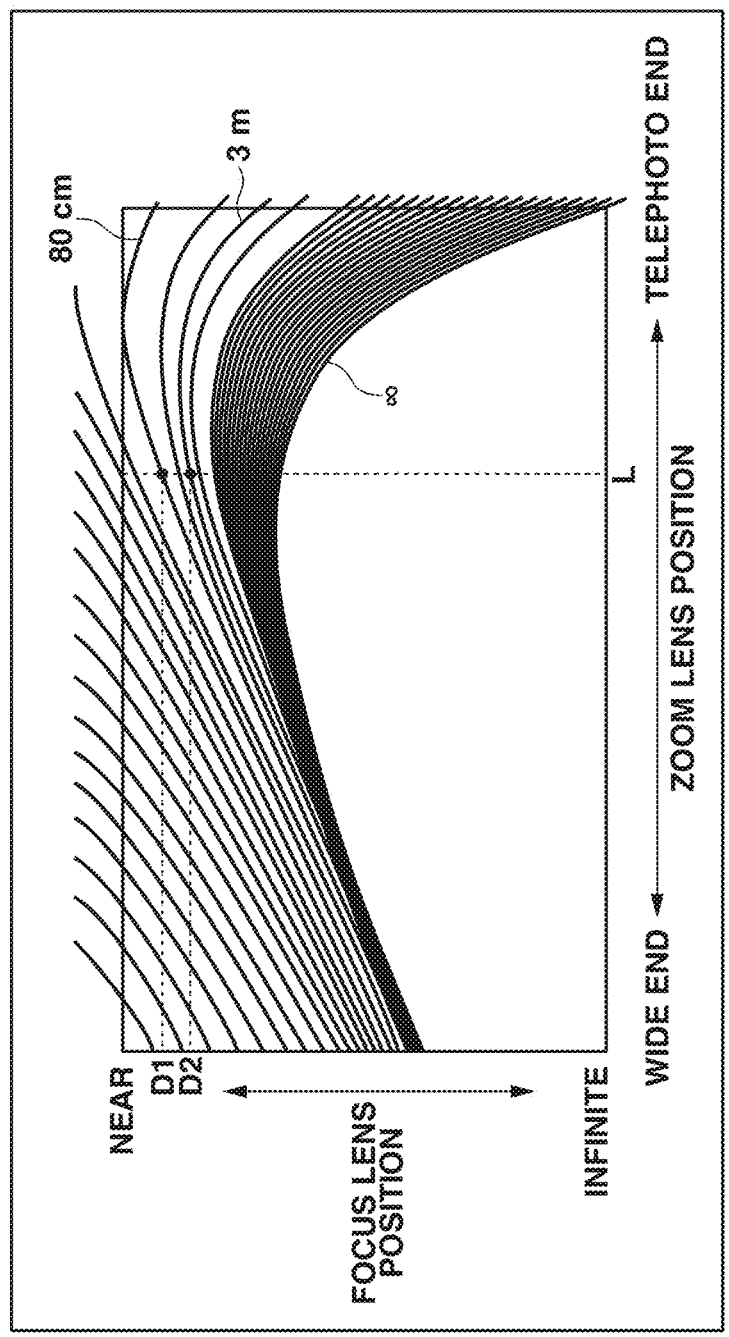
FIG. 2 is a graph illustrating a relationship between a zoom position and a focus position corresponding to a subject distance.

FIG. 2 illustrates examples of cam tracks indicated by the track data stored in the memory. The horizontal axis denotes the zoom lens position, and the vertical axis denotes the focus lens position. Referring to FIG. 2, each curve indicates a cam track generated by plotting the positional relationship between the zoom and the focus lenses for focusing a subject image at an identical subject distance on the image sensor. At the time of a zoom operation, zooming control can be performed with the fixed in-focus position by controlling the zoom and the focus lens positions along the cam tracks. The memory stores such cam tracks as table data.

However, an enormous memory capacity is required to store in the memory a table indicating the cam track with a fine granularity for each subject distance. For this reason, only table data corresponding to reference cam tracks for some subject distances is stored in the memory. Then, non-reference cam tracks of subject distances are acquired based on the internal division ratio of the cam track information on the near and the infinity sides by using the reference cam track data and the position information for the focus and the zoom lenses. Then, the acquired non-reference cam tracks are temporarily stored. In this way, the cam-track/depth-data storage unit 11 functions as a storage unit for storing track data indicating changes of the focus lens position as an in-focus position according to the subject distance and the zoom lens position.

An initial adjustment data storage unit 12 holds the reference positions and an adjustment value for the zoom and the focus lenses having undergone the adjustment (initial adjustment) before the shipment from the factory. An adjustment value is the difference between the track data stored in the cam-track/depth-data storage unit 11 and the track data actually measured before the shipment. The track data stored in the cam-track/depth-data storage unit 11 is track data before the initial adjustment. Track data after the initial adjustment can be acquired by applying the adjustment value acquired through the initial adjustment to the track data before the initial adjustment. In the process line of the factory, a monitoring apparatus 20 issues a communication command and transmits initial adjustment value to the communication unit 10. The initial adjustment values are transferred from the communication unit 10 to the initial adjustment data storage unit 12 via a zoom/focus control unit 16 and then written to the initial adjustment data storage unit 12. In lens initialization processing after power of the imaging apparatus 100 is turned ON, the imaging apparatus 100 assumes the HIGH/LOW switching position of each lens PI as a reference position. When the reference positions are determined, the distances to the wide and the telephoto ends of the zoom lens and the distances to the near and the far ends of the focus lens are obtained, making it possible to perform the control following the cam tracks illustrated in FIG. 2.

A distance measurement apparatus 19 measures the distance to a subject and transfers distance information to the zoom/focus control unit 16 via the communication unit 10. Although, in FIG. 1, the distance measurement apparatus 19 is disposed as an external apparatus, a distance measurement unit may be built in an imaging apparatus such as the lens barrel. If the imaging apparatus 100 includes a distance measurement unit, the distance measurement unit functions as a distance information acquisition unit. If the imaging apparatus 100 acquires distance information from an external apparatus via the communication unit 10, the communication unit 10 functions as a distance information acquisition unit. The cam track adjustment using the distance information acquired from the distance measurement apparatus 19 will be described below as a modification of the present embodiment. If the distance information is not to be used, the distance measurement apparatus 19 is not required.

Figure 3:
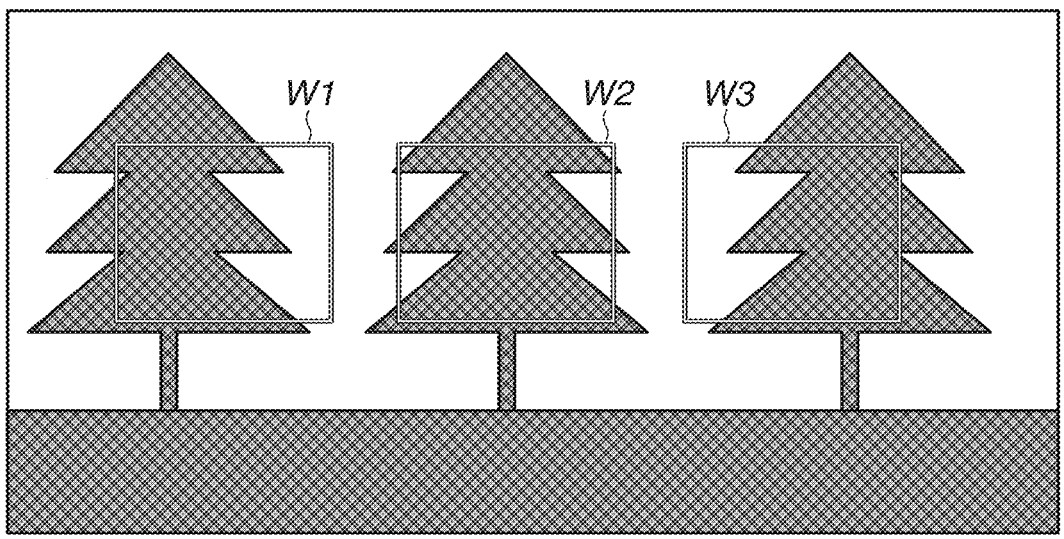
FIG. 3 illustrates an example of in-focus information.
Figure 4:
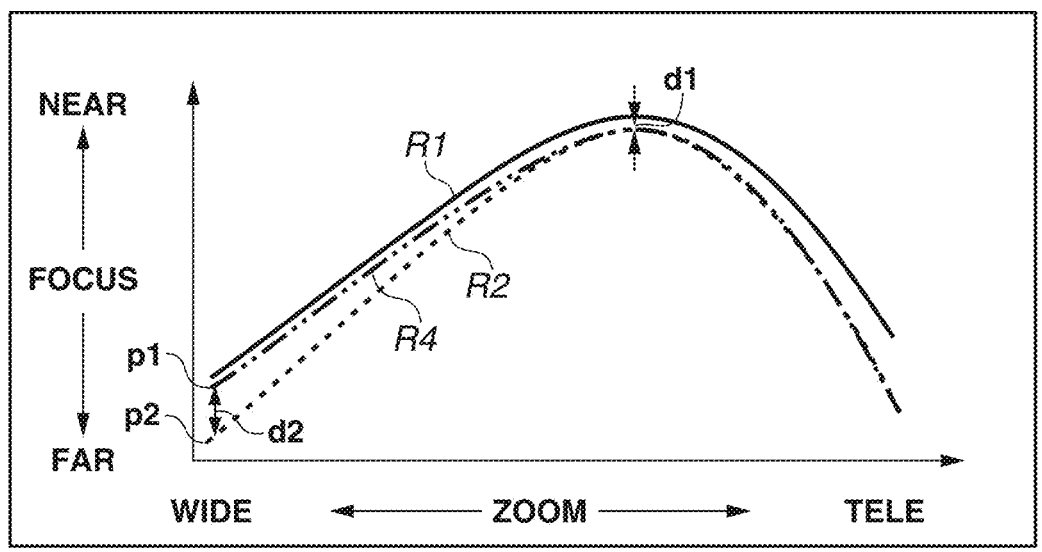
FIG. 4 is a graph illustrating examples of cam tracks when the imaging optical system according to the first exemplary embodiment of the present invention changes.
Figure 5:
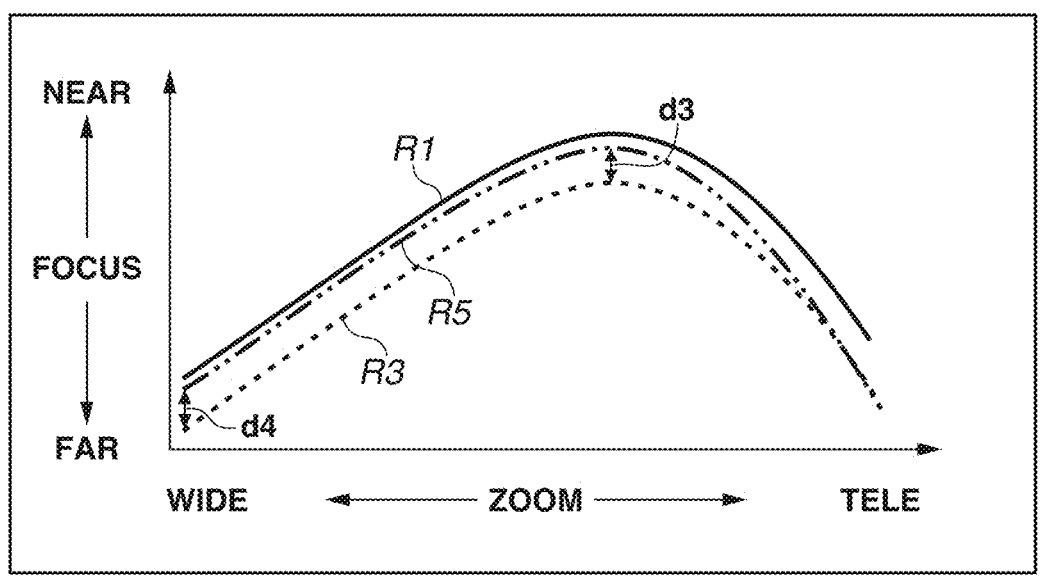
FIG. 5 is a graph illustrating examples of cam tracks when the image sensor according to the first exemplary embodiment of the present invention changes.

The track change detection unit 13 acquires the cam track data, control information about the zoom and the focus lenses, and the in-focus level, detects track changes based on these pieces of data, and estimates how the cam tracks changed. The track change detection unit 13 stores data to be used for track change detection in the detection data storage unit 14. As the data to be used for this detection, data in which each lens position is associated with the in-focus level and the distance information acquired from the distance measurement apparatus 19 can be handled. In addition, temperature information and drive time data may also be stored in the detection data storage unit 14. FIG. 3 a diagram illustrating in-focus frames, i.e., autofocus (AF) frames W1, W2, and W3. The camera signal processing unit 9 calculates a focus evaluation value based on the luminance difference (contrast) in the luminance signal of a region of a frame. A peak value and accumulated value in the region may be utilized for the evaluation value. In either case, with the increased contrast, the evaluation value increases and the image becomes closer to the in-focus state. With the decreased contrast, the evaluation value decreases and the image becomes closer to the defocus state. The in-focus level is calculated by using the evaluation value. The calculation method does not particularly matter if the in-focus level is high (or low) when the evaluation value is high (or low), respectively. For example, an in-focus ratio as the luminance difference normalized to a range from 0 to 100 is used as detection data. The focus evaluation value obtained in the AF frame and the in-focus level can be used as in-focus information. When the track change detection unit 13 detects a track data change, the track change detection unit 13 acquires the adjustment value by using an adjustment value acquisition method suitable for the change factor and stores the acquired adjustment value in the track adjustment data storage unit 15. The way of track changes for each track change factor will be described below with reference to FIGS. 4 and 5. FIG. 4 illustrates track changes when the position of the image sensor varies. FIG. 5 illustrates track changes when the positions of the lenses included in the imaging optical system 110 vary. Referring to FIGS. 4 and 5, a cam track R1 indicates a cam track immediately after the adjustment. Referring to FIG. 4, a cam track R2 is a cam track when the positions of the lenses included in the imaging optical system 110 vary. The cam track R2 changes in such a manner that the difference in the in-focus position from the cam track R1 increases at the wide and the telephoto ends, and decreases around the middle point between the wide and telephoto ends. In this way, the inclination of the cam track R2 is different from that of RE Since this difference relates to the lens sensitivity, not all of cam tracks are similar to the cam track R2. Referring to FIG. 5, a cam track R3 is a cam track when the position of the image sensor varies. The cam track R3 has such a shape that the in-focus position is totally offset regardless of the zoom lens position. When the cam track changes from the one immediately after the adjustment, the shape of the cam track differs depending on the changed factor. The present exemplary embodiment estimates a change factor and the shape of the cam track after the change and selects an adjustment value acquisition method based on the result of the estimation.

Referring to FIG. 4, a cam track R4 is a cam track used for lens control when the in-focus state is obtained at the telephoto end. When the zoom lens position is driven in the wide end direction from the in-focus state at the telephoto end, the focus lens position is driven along the cam track R4. However, since the actual in-focus position exists on the curve of the cam track R2, the in-focus state can be maintained up to the middle position indicated by a difference d1. When the zoom lens position is further driven in the wide end direction, the difference from the focus lens position actually indicating the in-focus state gradually increases, resulting in a difference d2 at the wide end. Likewise, referring to FIG. 5, a cam track R5 is a cam track used for lens control when the in-focus state is obtained at the telephoto end. When the zoom lens position is driven in the wide end direction from the in-focus state at the telephoto end, the focus lens position is driven along the cam track R5. Since the actual in-focus position exists on the curve of the cam track R3, a difference d3 arises at the timing of the middle position, and a difference d4 arises at the wide end. The in-focus level is high when the difference between the focus lens position actually indicating the in-focus state and the focus lens position on the cam track is small like the difference d1, and is low when the difference is large like the differences d2, d3 and d4. Therefore, a track change factor or the shape of a cam track after the change can be estimated by detecting whether the in-focus level is high between the telephoto end and the middle position and decreases as the zoom lens position comes closer to the wide end, or the in-focus level is low over the entire range between the telephoto and the wide ends. Then, the track change detection unit 13 functions as an adjustment value acquisition unit by acquiring the adjustment value based on the result of the estimation. This enables suitably adjusting the stored track data according to the change factor. Adjustment value acquisition methods will be described in detail below.

The zoom/focus control unit 16 applies the initial adjustment value stored in the initial adjustment data storage unit 12 and the adjustment value stored in the track adjustment data storage unit 15 to the data stored in the cam-track/depth-data storage unit 11. Then, the zoom/focus control unit 16 transmits control information of suitable track data to a focus drive unit 17 and a zoom drive unit 18.

Figure 6:
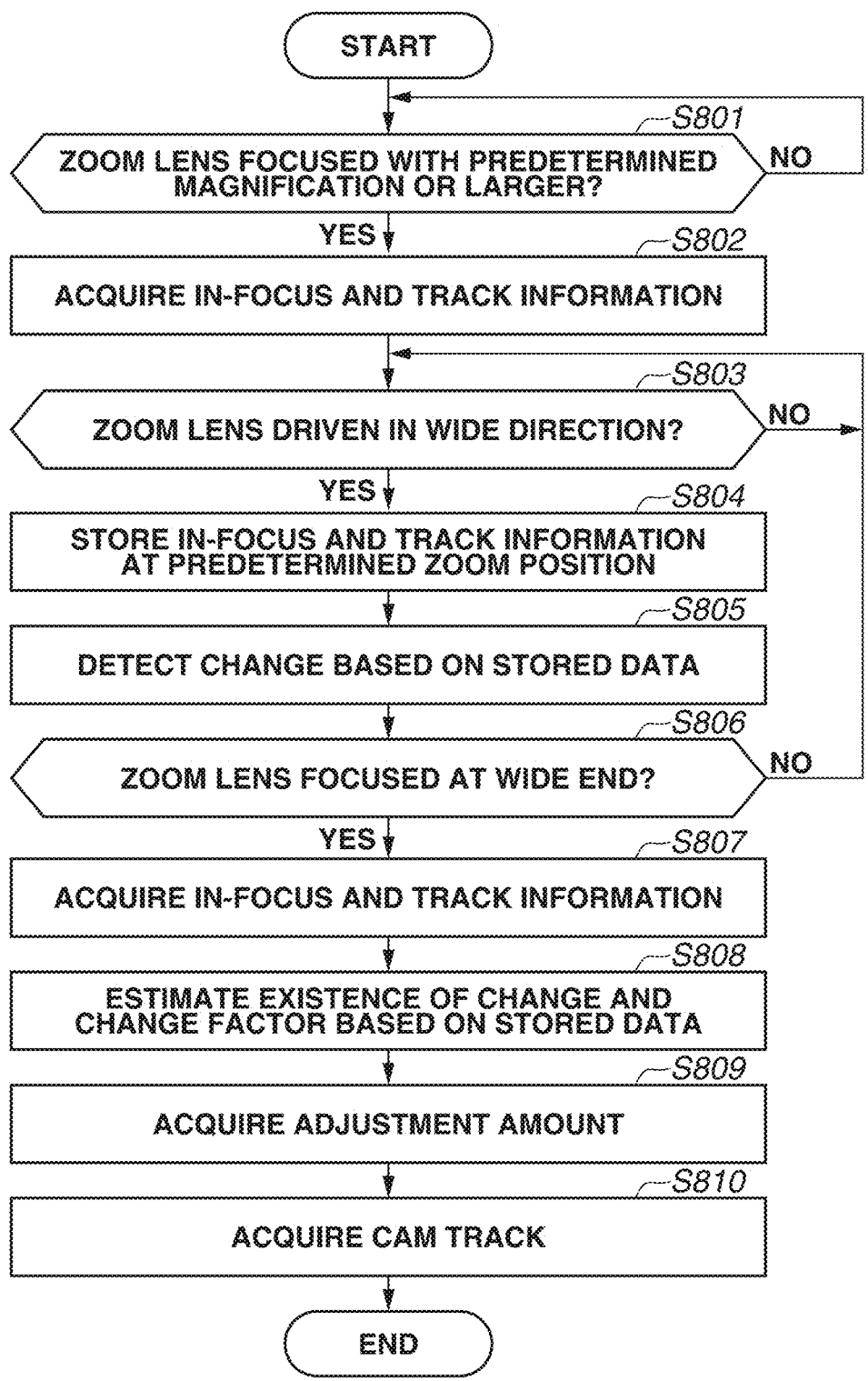
FIG. 6 is a flowchart illustrating detection control and correction control according to the first exemplary embodiment of the present invention.

A flow of processing in which the imaging apparatus 100 detects track data and adjusts the cam track suitable for the change factor will be described below with reference to FIG. 6. Unless otherwise noted, the flowchart illustrated in FIG. 6 is to be executed by the processor and memory included in the imaging apparatus 100. The processor and memory executing the processing of the flowchart configures the cam-track/depth-data storage unit 11 to the zoom/focus control unit 16 illustrated in FIG. 1.

Firstly, in step S801, the zoom/focus control unit 16 determines whether the zoom lens of the imaging apparatus 100 is in the in-focus state with a predetermined magnification or larger. The predetermined magnification may correspond to a start point with which the difference d3 at the middle position (the focus lens position indicating the in-focus state on the nearest side) illustrated in FIG. 5 can be recognized. The predetermined magnification needs to be a magnification larger on the telephoto end side than the middle position. When the zoom/focus control unit 16 determines the in-focus state at the timing when the focusing operation occurs, the zoom/focus control unit 16 checks the magnification of the zoom lens to determine whether to proceed with control. When the zoom/focus control unit 16 determines that the zoom lens is in the in-focus state with the predetermined zoom magnification or larger (YES in step S801), the processing proceeds to step S802. On the other hand, when the zoom/focus control unit 16 determines that the magnification of the zoom lens is less than the predetermined zoom magnification or that the zoom lens is in the defocus state (NO in step S801), the processing returns to step S801. In step S801, the zoom/focus control unit 16 waits for the next focusing operation.

In step S802, the track change detection unit 13 acquires the in-focus level and track information, and stores the data in the detection data storage unit 14. The track information in this case refers to the zoom and the focus lens positions at the timing of the in-focus state, the current position in the reference track data, the correction amount interpolated from the reference track data, and other information about cam tracks. In step S803, the zoom/focus control unit 16 waits (NO in step S803) until the zoom lens is driven in the wide end direction. When the zoom lens starts to be driven in the wide end direction (YES in step S803), the track change detection unit 13 acquires the in-focus level and the track information at each zoom position while the zoom/focus control unit 16 is performing zoom tracking by moving the focus lens along the cam track. Then, in step S804, the track change detection unit 13 stores the acquired data in the detection data storage unit 14 as data for detection. In step S805, based on the stored data for detection (referred to as accumulating data), the track change detection unit 13 detects the presence or absence of a cam track change. If the in-focus level is lower than a predetermined value although the current zoom and focus lens positions conform to the cam track corresponding to the current subject distance after being adjusted with the initial adjustment value, the track change detection unit 13 determines that a cam track change has occurred and detects the cam track change.

When the zoom lens is positioned at the wide end through zoom tracking, the zoom/focus control unit 16 performs the AF operation again. In step S806, the zoom/focus control unit 16 determines whether the zoom lens is positioned at the wide end and is in the in-focus state. When the zoom lens is positioned at the wide end and is in the in-focus state (YES in step S806), the processing proceeds to step S807. On the other hand, when the zoom lens is not at the wide end or is not in the in-focus state (NO in step S806), the processing returns to step S803. In other words, the zoom/focus control unit 16 repeats steps S803 to S805 until the zoom lens is driven to the wide end. When the zoom lens is in the in-focus state at the wide end (YES in step S806), the processing proceeds to step S807. In step S807, the track change detection unit 13 acquires the in-focus level and the track information and stores the data in the detection data storage unit 14. In step S808, the track change detection unit 13 detects the presence or absence of cam track change from the data in the detection data storage unit 14 and estimates a change factor. The track change detection unit 13 may estimate cam track change information instead of estimating a change factor itself. The cam track change information refers to information about how the cam track has changed, i.e., the shape of the cam track after the change, whether the shape of the cam track (inclination at each zoom position) itself changed, and whether values changed as a whole (i.e., values have been offset) with a small change of the shape itself. Then, the track change detection unit 13 selects adjustment amount acquisition processing based on the change factor estimated in step S808 from among a plurality of pieces of adjustment amount acquisition processing, and then performs the selected adjustment amount acquisition processing to acquire the adjustment amount. In step S809, the track change detection unit 13 stores the data of the acquired adjustment amount in a track adjustment data storage unit 15.

Figure 7:
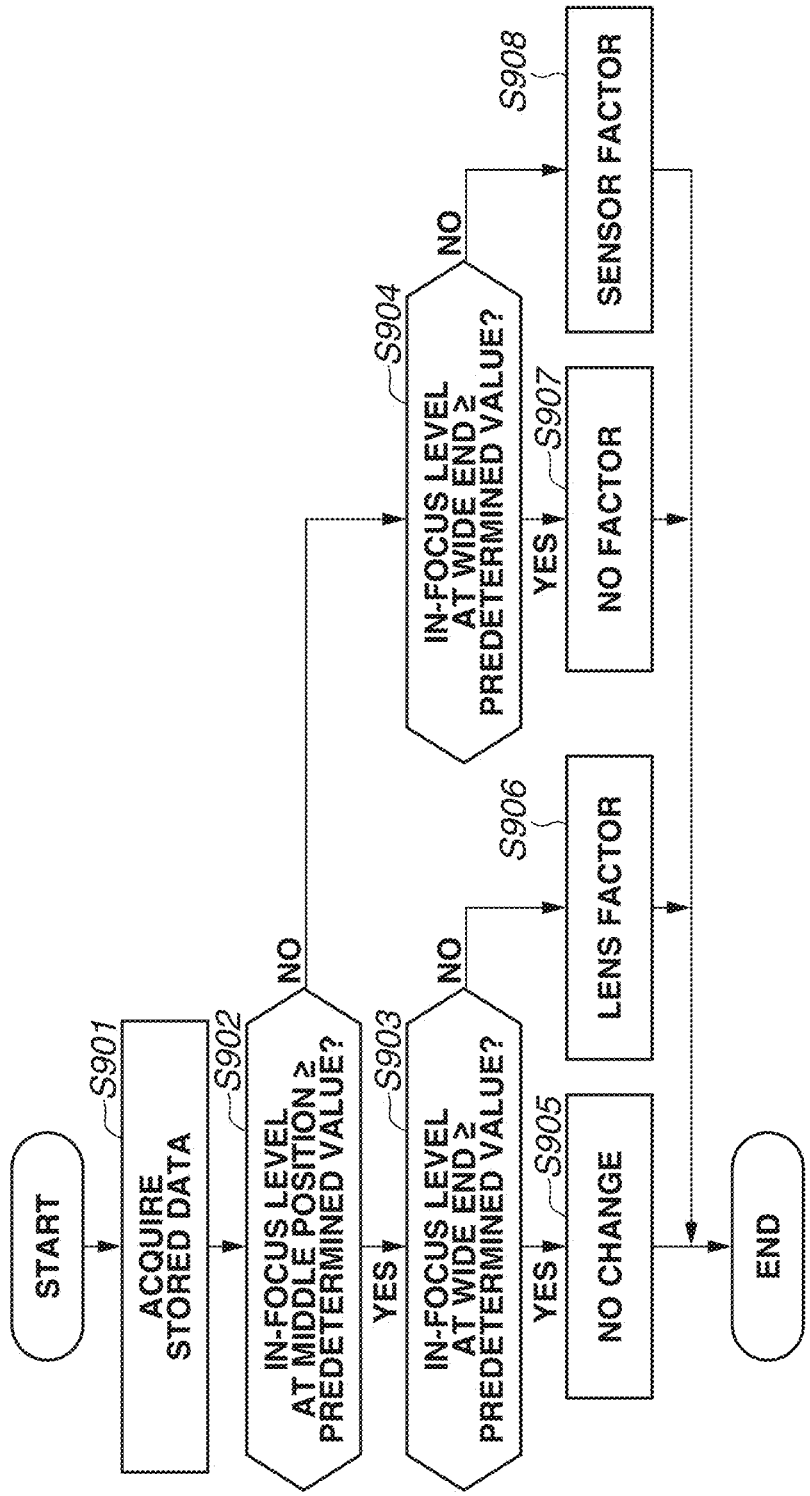
FIG. 7 is a flowchart illustrating a change factor analysis according to the first exemplary embodiment of the present invention.

Specific flows of processing in steps S808 and S809 will be described below with reference to FIG. 7. In step S901, the track change detection unit 13 acquires detection data from the detection data storage unit 14. This detection data may be changed corresponding to the imaging apparatus and environment, for example, by employing the control data for one time and employing the control data for multiple times. Basically, the use of the control data for multiple times can prevent correction errors to a further extent. In step S902, the track change detection unit 13 determines whether the in-focus level at the middle position during zoom tracking is larger than or equal to a predetermined value (first value). When the in-focus level at the middle position is larger than or equal to the predetermined value (YES in step S902), the processing proceeds to step S903. On the other hand, when the in-focus level is less than the predetermined value (NO in step S902), the processing proceeds to step S904.

In step S903, the track change detection unit 13 determines whether the in-focus level when the zoom and the focus lenses have moved to the wide end position through zoom tracking (in-focus level at the wide end position) is larger than or equal to a predetermined value (second value).

In step S904, the track change detection unit 13 also determines whether the in-focus level at the wide end position is larger than or equal to a predetermined value (third value). The second and the third values may be identical. The track change detection unit 13 estimates a cam track change factor based on the combination of the results of the determinations of whether the in-focus levels at the middle and the wide end positions are larger than or equal to predetermined values in steps S902, S903, and S904, and selects adjustment value acquisition processing according to the estimated change factor (how the cam track changed).

When the processing proceeds to step S905 (YES in step S903), the track change detection unit 13 determines that there is no cam track change and the adjustment is not required since the in-focus levels at the wide end and the middle positions are larger than or equal to predetermined values.

When the processing proceeds to step S906 (NO in step S903), the track change detection unit 13 determines that the change factor is position changes of the lenses included in the imaging optical system 110 because of the low in-focus level only at the wide end position, and selects adjustment value acquisition processing for setting different adjustment values depending on the zoom lens position (first adjustment value acquisition processing).

As a specific example of adjustment value acquisition processing for setting different adjustment values depending on the zoom lens position, an adjustment value acquisition method by multiplying the degree of the in-focus level deterioration by the lens sensitivity will be described below. First, the method acquires the difference between a focus lens position p1 (FIG. 4) when the zoom lens position is driven to the wide end following the cam track and a focus lens position p2 (FIG. 4) after the in-focus state is obtained through the AF operation after the zoom lens position reaches the wide end. In this case, the acquired difference (d2) serves as the adjustment amount at the wide end, and the adjustment amount at other than the wide end is obtained by multiplying the ratio of the lens sensitivity. For example, when the lens sensitivity at the wide end is 1, the lens sensitivity at the telephoto end is 2 and the sensitivity at the middle position is ⅕. When the adjustment amount at the wide end is 10, the adjustment amount at the telephoto end is 20 and the adjustment amount at the middle position is 2. The ratio of the lens sensitivity depends on the lens barrel.

Subsequently, when the processing proceeds to step S907 (YES in step S904), the track change detection unit 13 determines that the cam track has changed by the factor other than position changes of the lenses and image sensor included in the imaging optical system 110 because of the low in-focus level only at the middle position. However, according to the present exemplary embodiment, the zoom/focus control unit 16 does not acquire the adjustment values because of the possibility of complex factors. Instead, the zoom/focus control unit 16 sets error information and outputs a warning log to the monitoring apparatus 20 via the communication unit 10. The track change detection unit 13 may acquire the in-focus position following the cam track based on the in-focus information and cam track information at the middle position acquired in step S804, and perform processing for acquiring the difference in the actual in-focus position at the same middle position as the adjustment value at the middle position. The track change detection unit 13 acquires adjustment values at other zoom lens positions match the current cam track curve.

Lastly, when the processing proceeds to step S908 (NO in step S904), the track change detection unit 13 determines that the change factor is a position change of the image sensor because of the low in-focus levels at the wide end and the middle positions, and selects the acquisition processing for acquiring the offset value of the cam track (second adjustment value acquisition processing). According to the present exemplary embodiment, similar to the processing in step S906, the track change detection unit 13 performs processing for acquiring the difference d4 between the focus lens position when the zoom lens position is driven to the wide end following the cam track and the focus lens position after the in-focus state is obtained through the AF operation after the zoom lens position reaches the wide end. Subsequently, the track change detection unit 13 sets the adjustment values having the same value from the wide to the telephoto ends without considering the lens sensitivity. For example, when the adjustment value at the wide end is 10, the adjustment values at the telephoto end and the middle positions are also 10. The differences at the middle and the telephoto end points may be acquired as adjustment values instead of the difference d4 at the wide end.

The flowchart illustrated in FIG. 6 will be described again below. Lastly, in step S810, the zoom/focus control unit 16 adjusts the cam track data stored in the cam-track/depth-data storage unit 11 based on the initial adjustment values stored in the initial adjustment data storage unit 12 and the adjustment values stored in the track adjustment data storage unit 15 in step S809. This makes it possible to maintain the cam track data suitable for the zoom tracking operation. This also makes it possible to maintain high focusing accuracy even if the actual cam track has changed from the cam track adjusted at the time of factory adjustment caused by shock, vibration, aging, or temperature variations. The adjustment values for the number of zoom lens positions generated by dividing the range from the wide to the telephoto ends into a plurality of sections are stored in the track adjustment data storage unit 15. Linear interpolation needs to be performed between the adjustment values.

As a modification of the present exemplary embodiment, cam track changes can be detected by using the distance information acquired from the distance measurement apparatus 19 instead of the in-focus level. The communication unit 10 acquires the distance information from the distance measurement apparatus 19 and transmits the distance information to the track change detection unit 13 via the zoom/focus control unit 16. The track change detection unit 13 needs to use subject distance information acquired from the distance measurement apparatus 19 and the difference in the subject distance calculated based on the zoom and the focus lens positions and the current cam track instead of the in-focus level. The difference can be used as a correction amount since each focus lens position based on the two different subject distances can be obtained from the track data. When the differences at the middle position and the wide end are larger than respective predetermined values (fourth and fifth values) (NO in step S904), the processing proceeds to step S908. On the other hand, when the difference at the middle position is smaller than the predetermined value (fourth value) and when the difference at the wide end is larger than or equal to the predetermined values (fifth value) (NO in step S903), the processing proceeds to step S906. When the adjustment values have not been stored in the track adjustment data storage unit 15, the current cam track refers to the cam track after the factory adjustment. On the other hand, when the adjustment values have been stored in the track adjustment data storage unit 15, the current cam track refers to the cam track after the adjustment based on the stored adjustment values and initial adjustment values.

For example, if the distance measurement apparatus 19 detects the distance to the subject as 5 m and that the zoom and the focus lens positions when the imaging apparatus is in the in-focus state exist at 3 m on the cam track, a difference of 2 m arises. The track change detection unit 13 acquires the adjustment values corresponding to the difference (2 m) from the cam track data through linear interpolation and stores the acquired adjustment values in the track adjustment data storage unit 15. This enables suitably adjusting the track data like the case where the in-focus level is used. Since the accuracy of the evaluation value may degrade depending on the subject and captured scene, the use of the distance information may probably enable accurately detecting cam track changes if the distance measurement is possible. However, the use of the evaluation value is more advantageous since the distance measurement apparatus 19 is not required. The distance measurement method does not particularly matter as long as the distance measurement apparatus 19 can perform the distance measurement. Examples of applicable distance measurement methods include the use of an optical distance measurement sensor, a supersonic distance measurement sensor, and distance information calculated from phase difference information.

In a second exemplary embodiment, an imaging apparatus acquires the adjustment value according to the first exemplary embodiment and acquires adjustment value corresponding to cam track changes caused by changes of the zoom and the focus lens reference positions. Descriptions duplicated with those of the first exemplary embodiment will be omitted. The second exemplary embodiment detects field angle changes by using image information, and is applied to imaging apparatuses used for image capturing in a stationary state, including monitoring cameras and broadcasting cameras attached to a pan head. The present exemplary embodiment is also applicable to imaging apparatuses fixed to a moving object, such as in-vehicle cameras, as long as the moving object itself exists in the imaging range.

Figure 8:
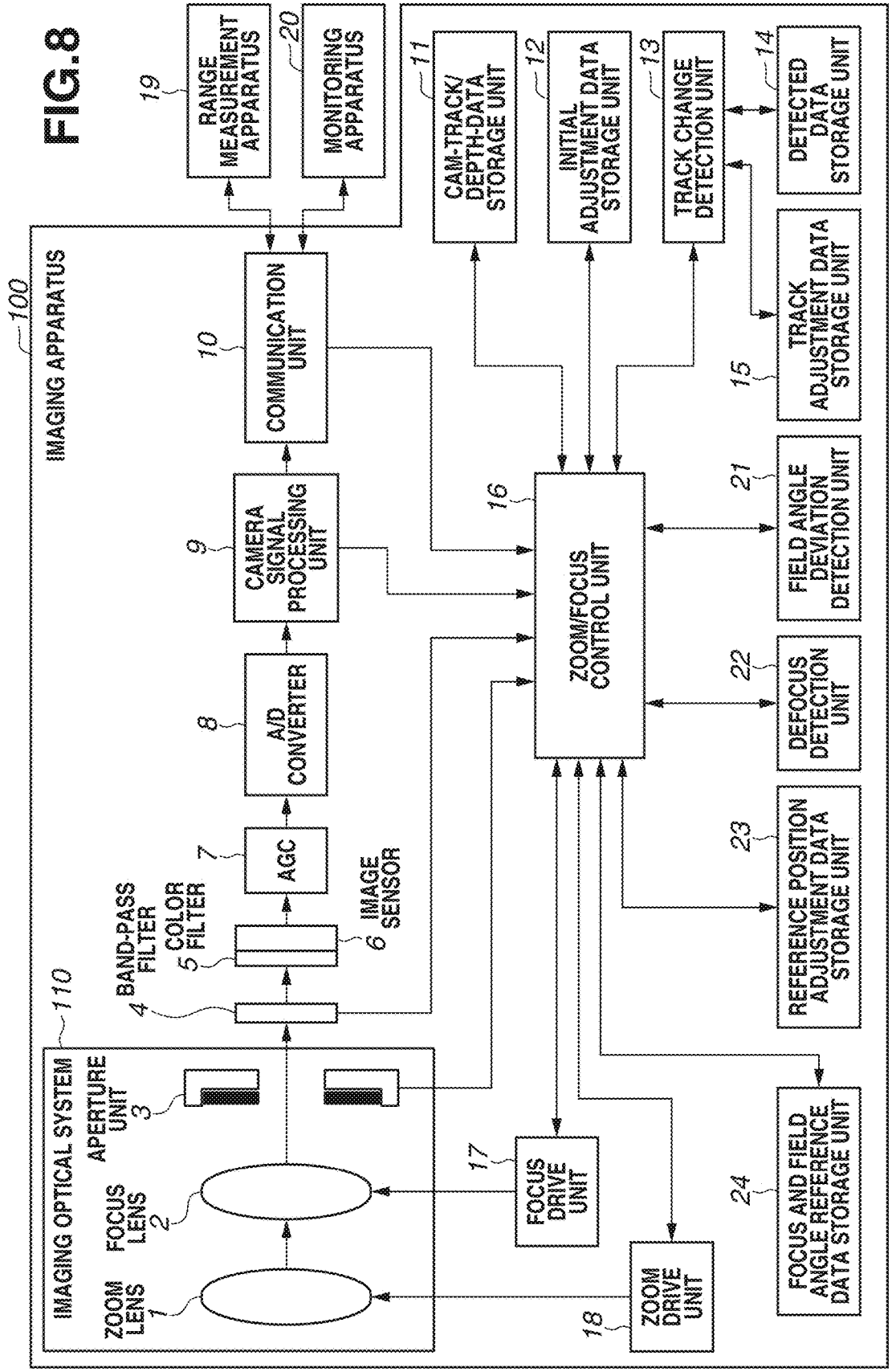
FIG. 8 is a block diagram illustrating a configuration of an imaging apparatus according to a second exemplary embodiment of the present invention.

FIG. 8 is a block diagram illustrating a configuration of the imaging apparatus 100 according to the present exemplary embodiment. The imaging apparatus 100 according to the present exemplary embodiment is different from the imaging apparatus 100 according to the first exemplary embodiment in that the imaging apparatus 100 according to the present exemplary embodiment includes a field angle deviation detection unit 21, a defocus detection unit 22, a reference position adjustment data storage unit 23, and a focus and field angle reference data storage unit 24. Like the cam-track/depth-data storage unit 11 to the zoom/focus control unit 16, each of these units can be configured by the processor and memory included in the imaging apparatus 100. Each unit will be described below.

The field angle deviation detection unit 21 compares the reference field angle indicated by the reference field angle information stored in the focus and field angle reference data storage unit 24 with the current field angle to detect the deviation amount. This detection is made, for example, at the timing when the zoom and the focus lenses are driven to initial setting positions (home positions) or preset positions, and the in-focus state is obtained. Arbitrary positions can be set as the initial setting and the preset positions by the user. After the zoom and the focus lenses are driven to specified positions, the field angle deviation detection unit 21 compares the current field angle with the reference field angle to determine whether there is difference between the two field angles. In this case, the field angle deviation detection unit 21 does not compare the field angles themselves and but determines whether there is the difference between the field angles based on the image information. FIG. 11 illustrates images of field angle information to be stored as the reference field angle information. The field angle information to be stored as the reference field angle information may be image data of the entire screen or image data of partial images depending on the convenience of the memory. The template matching technique is a typical technique for comparing field angles based on the image information.

The field angle deviation detection unit 21 detects whether the same pattern as the image stored as the reference data illustrated in FIG. 11 exists in the image currently being captured. In the template matching technique, the field angle deviation detection unit 21 calculates the similarity between images. Therefore, the field angle can be said to be not deviated if the similarity is larger than or equal to a predetermined value. When feature point information is used, coordinate information for feature points is utilized. The field angle deviation detection unit 21 compares the coordinates of prestored feature points (circles illustrated in FIG. 12) with the coordinates of feature points calculated from the image currently being captured. When the difference between the two coordinates is less than a predetermined value, the field angle can be said not to be deviated. If the field angle changes, the coordinates of the feature points come close to the screen center or spread further from the screen center.

When the field angle deviation detection unit 21 determines that there is a difference in the field angle, the field angle deviation detection unit 21 compares the current field angle with the field angle stored as reference data while moving the zoom lens, and searches for a position where the two field angles are matched to detect the field angle deviation amount.

The defocus detection unit 22 compares the current in-focus position with the in-focus position information (reference in-focus information) stored in the focus and field angle reference data storage unit 24 as reference information to detect the focus lens deviation amount based on the difference between the two in-focus positions.

The reference position adjustment data storage unit 23 stores the field angle deviation amount and the focus lens deviation amount detected by the field angle deviation detection unit 21 and the defocus detection unit 22, respectively, as adjustment values.

The focus and field angle reference data storage unit 24 stores the in-focus position information and the field angle information acquired at a specific timing. The in-focus position and the field angle information are used to memorize the state before the reference position deviates. The specific timing refers to the registration timing of the initial setting positions (home positions) set at the time of installation (at the time of fixation) and the registration timing of arbitrary positions (preset positions) used in the preset mode for fixing the focus and the zoom lenses at arbitrary positions. Alternatively, temperature information and time information may be used as a trigger. Focus reference data may include the evaluation value, in-focus position, and in-focus level for each of AF frames such as the in-focus frames illustrated in FIG. 3, the ratio of the evaluation value between the frames, and the ratio of the in-focus level between the frames.

Figure 9:
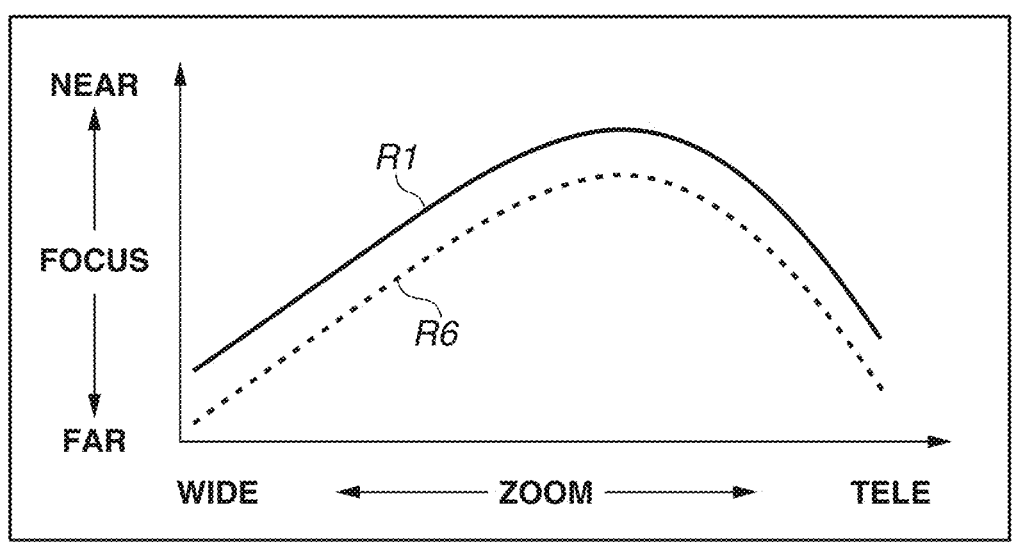
FIG. 9 is a graph illustrating track data changes with a deviated reference position of a focus lens.
Figure 10:
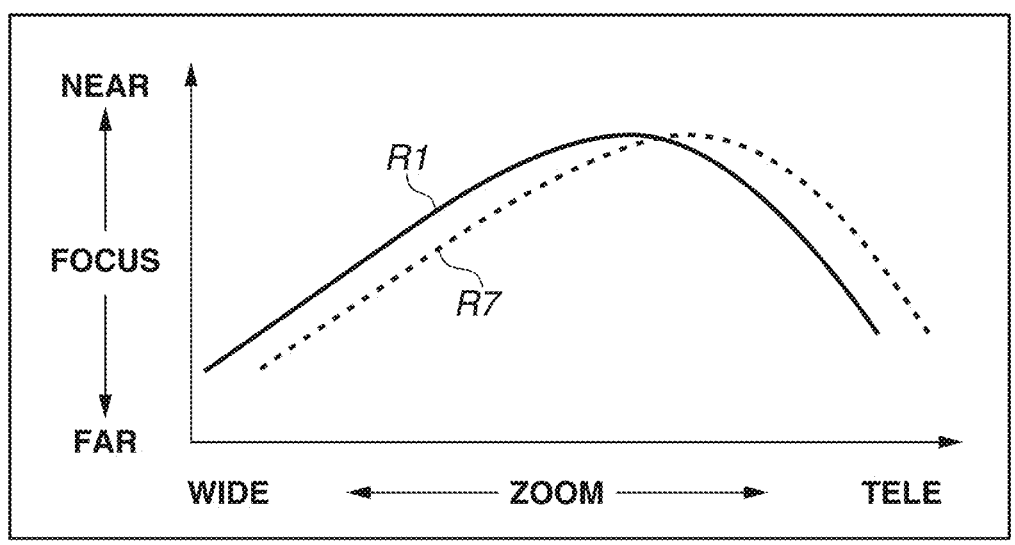
FIG. 10 is a graph illustrating track data changes with a deviated reference position of a zoom lens.

The influence on the cam track when the reference position of each lens deviates will be described with reference to FIGS. 9 and 10. Referring to FIGS. 9 and 10, a cam track R1 indicates a cam track immediately after the adjustment. Referring to FIG. 9, a cam track R6 is a cam track when the focus lens reference position deviates. Like the cam track illustrated in FIG. 5, the cam track R6 has such a shape that the in-focus position is offset as a whole regardless of the zoom lens position. Referring to FIG. 10, a cam track R7 is a cam track when the zoom lens reference position deviates. The influence of the in-focus position change differs depending on the zoom lens position. When the cam tracks R1 and R7 are compared at the same zoom lens position, there is a large difference in field angle between them. Although omitted in FIG. 9, when cam tracks are traced when the in-focus state is obtained at the telephoto end, the in-focus level at the middle position is low in both FIGS. 9 and 10. More specifically, the in-focus level at the middle position is low in both cases where the image sensor position changes and where the reference position of each lens deviates according to the first exemplary embodiment. Therefore, it may be necessary to segregate the position change factors (how position changes occurred). In particular, this segregation may possibly be required by imaging apparatuses used under severe environmental conditions, for example, under large temperature changes and the application of shock a number of times. After the processing proceeds to step S908 (it is determined to be a sensor factor) in the first exemplary embodiment, the segregation is enabled by executing the flowchart according to the present exemplary embodiment.

Figure 13:
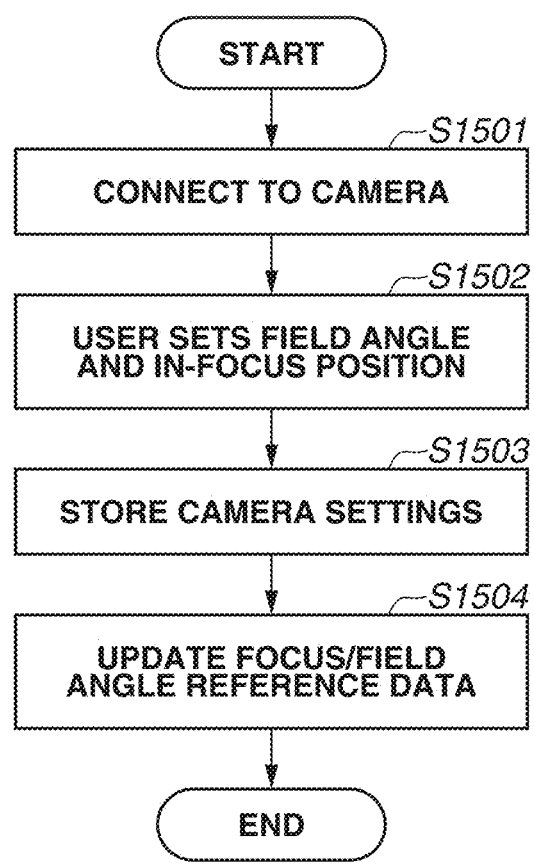
FIG. 13 is a flowchart illustrating reference data registration according to the second exemplary embodiment of the present invention.

A flow of processing since the user updates camera settings till the reference data of the focus and the field angle are stored in the focus and field angle reference data storage unit 24 will be described with reference to FIG. 13. First, in step S1501, the user connects the camera from the monitoring apparatus 20 to the communication unit 10. Subsequently, the user sends a zoom/focus drive instruction from the monitoring apparatus 20 to the zoom/focus control unit 16 via the communication unit 10. The zoom/focus control unit 16 transmits a control instruction for driving the focus and the zoom lenses to the focus drive unit 17 and the zoom drive unit 18, respectively. In step S1502, the user sets the field angle and the in-focus position. In step S1503, the zoom/focus control unit 16 stores information about the image to be captured at the current zoom lens position and the focus lens position (in-focus position). The processing so far is the same as the processing for registering the initial setting positions (home positions) and registering the preset positions of arbitrary positions where the lenses are fixed.

After the image information and the focus lens position are stored in step S1503, then in step S1504, the zoom/focus control unit 16 writes the information stored in S1503 to the focus and field angle reference data storage unit 24 as reference in-focus information and reference field angle information. Then, the processing of this flowchart is terminated. At this timing, the focus and field angle reference data storage unit 24 uses different storage areas between the registration timing of the initial setting positions (home positions) and the registration timing of the preset positions of arbitrary positions where the lenses are fixed. Image information to be used as the reference data of the field angle ideally is a background image including no moving body. Therefore, the zoom/focus control unit 16 may perform the control in step S1504 after confirming that no moving body is included based on camera signals. In addition, if the focus reference data includes the distance information as well as the in-focus information, it becomes easier to prevent correction errors. The distance measurement apparatus 19 may transmit the distance information to the zoom/focus control unit 16 via the communication unit 10 at predetermined intervals to include the distance information in the focus reference data. Although, in the configuration illustrated in FIG. 8, the distance measurement apparatus 19 is an external apparatus, it may be integrated with the image sensor, like the first exemplary embodiment.

Figure 14:
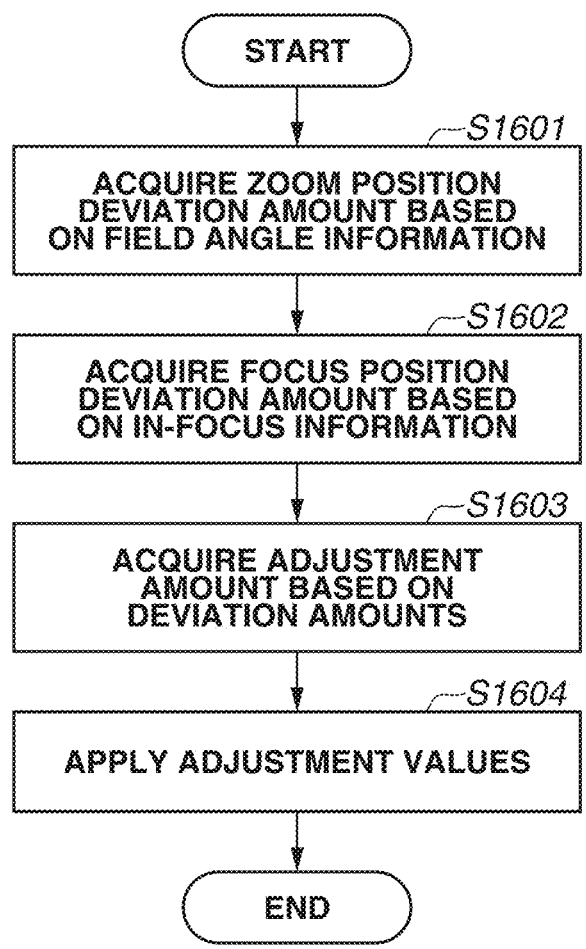
FIG. 14 is a flowchart illustrating control for correcting focus and zoom position deviations according to the second exemplary embodiment of the present invention.

A flow of processing since the lenses are driven to the initial setting positions or the preset positions till the adjustment values of the focus and the field angle deviation are applied will be described with reference to FIG. 14. The start of this flowchart is triggered when the user issues an instruction for lens drive to set positions from the monitoring apparatus 20 to the communication unit 10 or when the communication unit 10 detects an external event or an internal event such as a timer.

First, in step S1601, the zoom/focus control unit 16 transmits the current camera signal information and the reference data stored in the focus and field angle reference data storage unit 24 to the field angle deviation detection unit 21 to instruct the field angle deviation detection unit 21 to calculate the zoom position deviation amount. Likewise, in step S1602, the zoom/focus control unit 16 transmits the current camera signal information and the reference data information to the defocus detection unit 22 to instruct the defocus detection unit 22 to calculate the focus position deviation amount. The detection of the deviation amount for the field angle is performed first because of a large influence on the in-focus state when the field angle adjustment by the zoom lens is performed.

In step S1603, the zoom/focus control unit 16 writes the deviation amounts of the lenses acquired in steps S1601 and S1602 to the reference position adjustment data storage unit 23 as adjustment amount The zoom/focus control unit 16 may compare the deviation amount acquired from the defocus detection unit 22 with the depth data acquired from the cam-track/depth-data storage unit 11, and only when the deviation amount exceeds the depth of field, write the deviation amount.

In a case of subsequently driving the zoom and the focus lenses, then in step S1604, the zoom/focus control unit 16 applies the adjustment values stored in the reference position adjustment data storage unit 23 to the data in the initial adjustment data storage unit 12 and the cam-track/depth-data storage unit 11, and then performs tracking control and control for lens drive to the registered positions.

Flows of processing for calculating the zoom position deviation amount performed in step S1601 and processing for calculating the focus position deviation amount performed in step S1602 will be described in detail with reference to FIGS. 15 and 16.

Figure 12:
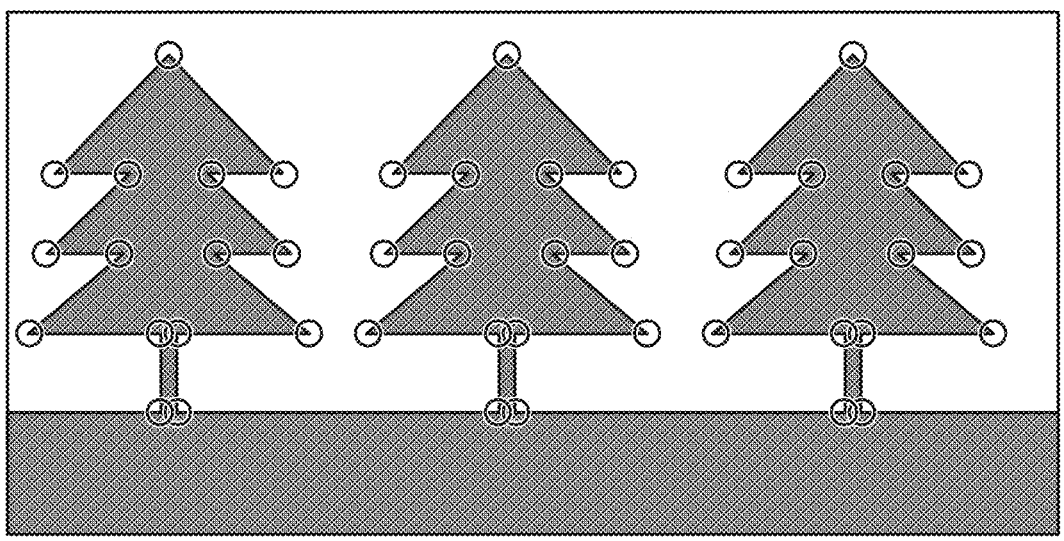
FIG. 12 illustrates an example of field angle feature quantity information according to the second exemplary embodiment of the present invention.
Figure 15:
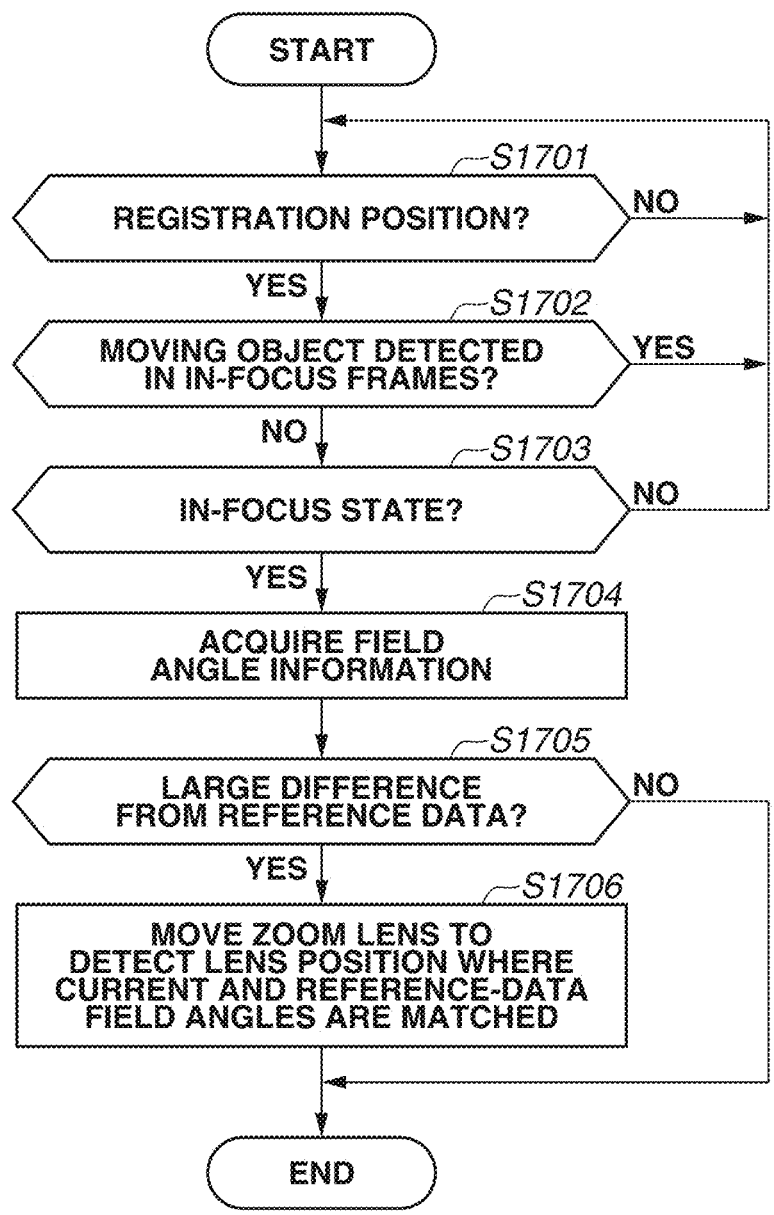
FIG. 15 is a flowchart illustrating processing for detecting a zoom position deviation amount according to the second exemplary embodiment of the present invention.
Figure 16:
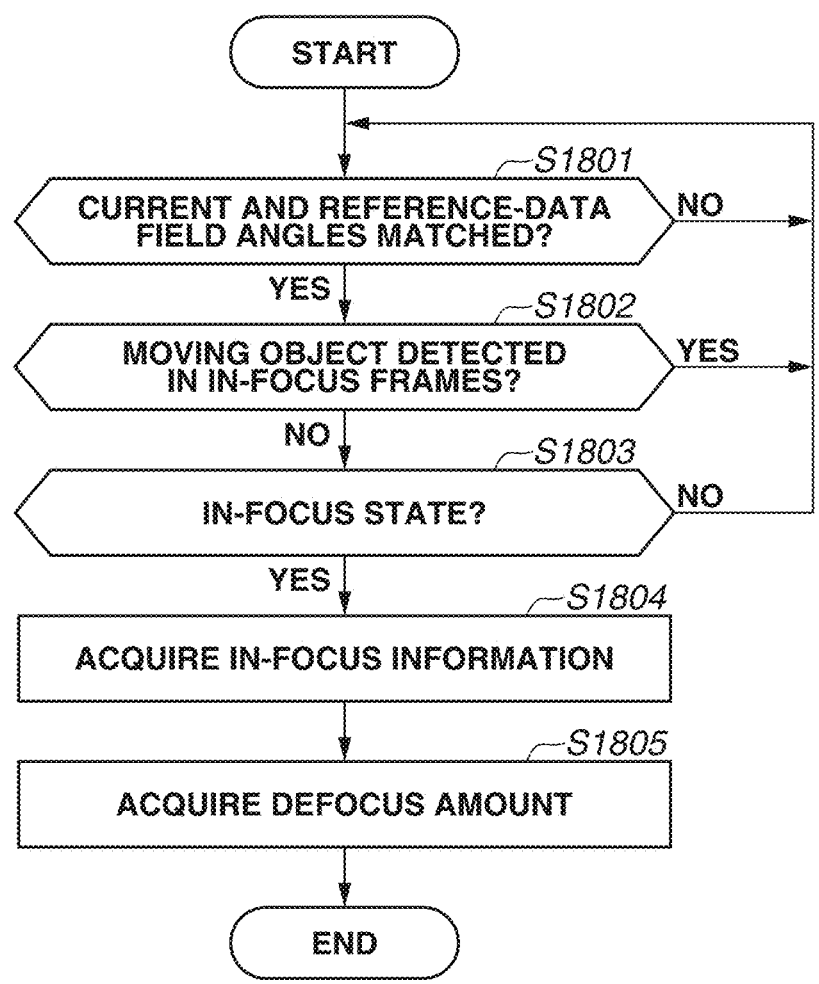
FIG. 16 is a flowchart illustrating processing for detecting a focus position deviation amount according to the second exemplary embodiment of the present invention.

The field angle deviation detection unit 21 executes the flowchart illustrated in FIG. 15 based on INPUT information from the zoom/focus control unit 16. First, in step S1701, the zoom/focus control unit 16 checks whether the zoom and the focus lenses have been driven to the registered positions. When the zoom and the focus lenses are currently being driven and have not yet been driven to the registered positions (NO in step S1701), the zoom/focus control unit 16 repeats the processing in step S1701. On the other hand, when the zoom and the focus lenses have been driven to the registered positions (YES in step S1701), the processing proceeds to step S1702. In step S1702, the zoom/focus control unit 16 checks whether a moving object exists in the in-focus frames. When a moving body is detected (YES in step S1702), the processing returns to step S1701. On the other hand, when no moving body is detected (NO in step S1702), the processing proceeds to step S1703. In step S1703, the zoom/focus control unit 16 checks the in-focus state. There is a case where autofocus is reactivated at the timing at which a moving body is no longer detected. When the focus lens is driven in not in-focus state (NO in step S1703), the processing returns to step S1701. On the other hand, when the zoom/focus control unit 16 determines the in-focus state (YES in step S1703), the processing proceeds to step S1704. In step S1704, the zoom/focus control unit 16 acquires the current field angle information. In step S1704, the field angle deviation detection unit 21 acquires the image information, as illustrated in FIGS. 11 and 12, as the field angle information based on the current camera information.

Upon acquisition of the field angle information, in step S1705, the field angle deviation detection unit 21 compares the current field angle information with the field angle information in the reference data. When the difference between the current field angle and the reference data is larger than a threshold value (YES in step S1705), the processing proceeds to step S1706. In step S1706, the field angle deviation detection unit 21 finely moves the zoom lens to adjust the field angle with the reference data and, while comparing the current field angle information obtained with the field angle information in the reference data, searches for and detect a lens position where the two field angles are matched. Then, the field angle deviation detection unit 21 transfers information about the deviation amount as the difference between the zoom position where the two field angles are matched and the zoom position before moving the zoom lens, to the zoom/focus control unit 16. On the other hand, when the difference is equal to or less than the threshold value (NO in step S1705), the zoom/focus control unit 16 ends the flowchart without updating the adjustment amount.

Subsequently, the defocus detection unit 22 performs the flowchart illustrated in FIG. 16 based on the INPUT information from the zoom/focus control unit 16. This flowchart is executed after the zoom position deviation amount is acquired, more specifically, after the zoom lens is driven to the position where the current field angle coincides with the field angle in the reference data. In step S1801, the defocus detection unit 22 compares the field angle information in the reference data with the current field angle information to confirm whether the current field angle coincides with the field angle in the reference data. When the defocus detection unit 22 determines that the current field angle does not coincide with the field angle in the reference data (NO in step S1801), the defocus detection unit 22 determines that the field angle deviation detection unit 21 has not yet completed the processing in step S1601 or that the adjustment is not necessary, and waits until the field angle deviation detection unit 21 completes the processing in step S1706. When the defocus detection unit 22 determines that the current field angle coincides with the field angle in the reference data (YES in step S1801), the processing proceeds to step S1802. In step S1802, the defocus detection unit 22 checks whether a moving body exists in the in-focus frames, like step S1702. When a moving body is detected (YES in step S1802), the processing returns to step S1801. On the other hand, when no moving body is detected (NO in step S1802), the processing proceeds to step S1803. In step S1803, the defocus detection unit 22 checks the in-focus state, like step S1703. When the focus lens is driven in not in-focus state (NO in step S1803), the processing returns to step S1801. On the other hand, when the focus lens is in-focus state (YES in step S1803), the processing proceeds to step S1804. In step S1804, the defocus detection unit 22 acquires in-focus information as illustrated in FIG. 3 from the current camera information. In step S1805, the defocus detection unit 22 compares the current in-focus information with the in-focus information in the reference data, acquires the difference in the focus lens position as the deviation amount, and transfers the deviation amount information to the zoom/focus control unit 16. Then, the processing of the flowchart is terminated.

The present exemplary embodiment makes it possible to adjust the track data even if the reference positions of the focus and the zoom lens positions have changed from the reference positions adjusted in the initial adjustment caused by shock, vibration, aging, or temperature variations and results in changes in the track data for lens control.

Figure 17:
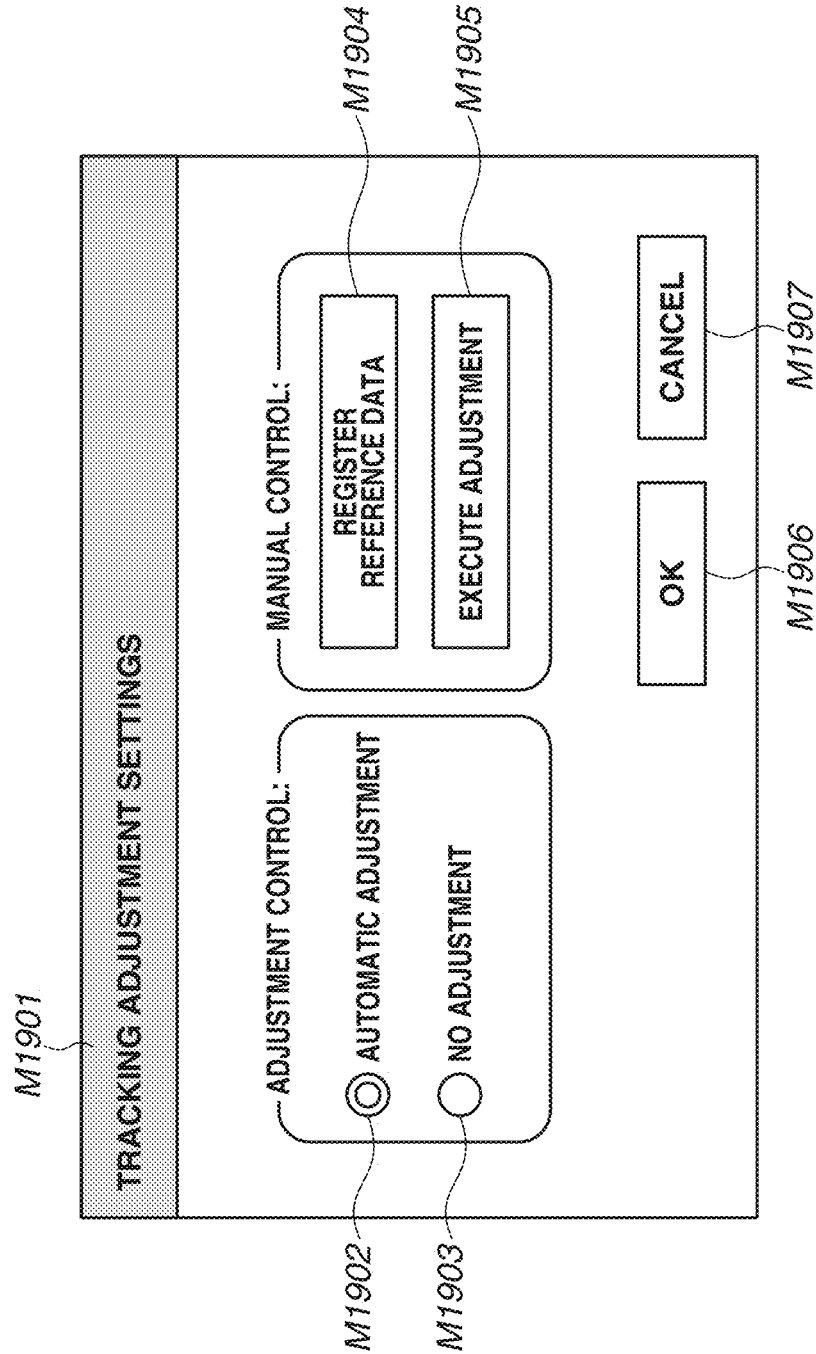
FIG. 17 illustrates an example of a tracking correction application according to a third exemplary embodiment of the present invention.

FIG. 17 illustrates an example of an application screen according to a third exemplary embodiment of the present invention. The user can switch the control according to the first and the second exemplary embodiments to be enabled or disabled, and issue an execution trigger at an arbitrary timing. The configuration of the present exemplary embodiment is similar to the configurations of the first and the second exemplary embodiments, and descriptions of duplicated contents will be omitted. Also, for flowcharts having the same contents as those of the first and the second exemplary embodiments, redundant descriptions will be omitted.

The user can display a tracking adjustment setting application window M1901 and perform operations from the monitoring apparatus 20. On the tracking adjustment setting application window M1901, the user can switch the control for adjusting the reference positions of the zoom and the focus lenses to be enabled or disabled, and can register and adjust the reference positions with an arbitrary trigger.

For adjustment control, the screen provides menu items "Automatic Adjustment" (item M1902) and "No Adjustment" (item M1903) to enable selection of two different patterns. Each item will be described below. When "Automatic Adjustment" (item M1902) is selected, the adjustment control according to the first and the second exemplary embodiments is performed. When "No Adjustment" (item M1903) is selected, the adjustment control is not performed. In FIG. 17, the menu configured to allow selection of two patterns of "Automatic Adjustment" (item M1902) and "No Adjustment" (item M1903) is illustrated. However, the menu may be configured to allow more detailed selections. For example, the menu may be configured to only allow select the pattern of performing the adjustment in the first exemplary embodiment. Further, in a case where the zoom lens and the focus lens are driven to the respective initial positions, among the adjustments described in the second exemplary embodiment, the menu may be configured to allow the selection of a pattern of adjusting the deviation, from the respective initial positions thereof, of the reference position of the zoom lens and the reference position of the focus lens. Further, in a case where the zoom lens and the focus lens are driven to the respective preset positions of the zoom lens and the focus lens, among the adjustments in the second exemplary embodiment, the menu may be configured to allow selection of the pattern of adjusting the deviation, from the respective preset positions thereof, of the reference position of the zoom lens and the reference position of the focus lens.

For manual control, the screen provides two different buttons "Register Reference Data" (item M1904) and "Execute Adjustment" (item M1905). Each item will be described below. When "Register Reference Data" (item M1904) is selected, the flowchart illustrated in FIG. 13 according to the second exemplary embodiment is performed. When "Execute Adjustment" (item M1905) is selected, the flowchart illustrated in FIG. 14 according to the second exemplary embodiment is performed.

When an OK button (item M1906) is pressed, the zoom/focus control unit 16 stores the adjustment control conditions and closes the application screen. When a Cancel button (item M1907) is pressed, the zoom/focus control unit 16 closes the application screen without storing the adjustment control conditions. The items M1904 and M1905 for manual control are immediately reflected.

This makes it possible to maintain the high focusing accuracy even if the track data for lens control adjusted at the time of factory adjustment has changed caused by shock, vibration, aging, or temperature variations.

The first and the second exemplary embodiments have been described above centering on an example where the cam track adjustment is performed during image capturing. A fourth exemplary embodiment will be described below centering on an imaging apparatus that performs the cam track adjustment control according to the first and the second exemplary embodiments at an arbitrary timing as a maintenance mode and automatically sets an imaging range suitable for the adjustment control. Descriptions of the contents duplicated with those of the first and the second exemplary embodiments will be omitted.

Figure 18:
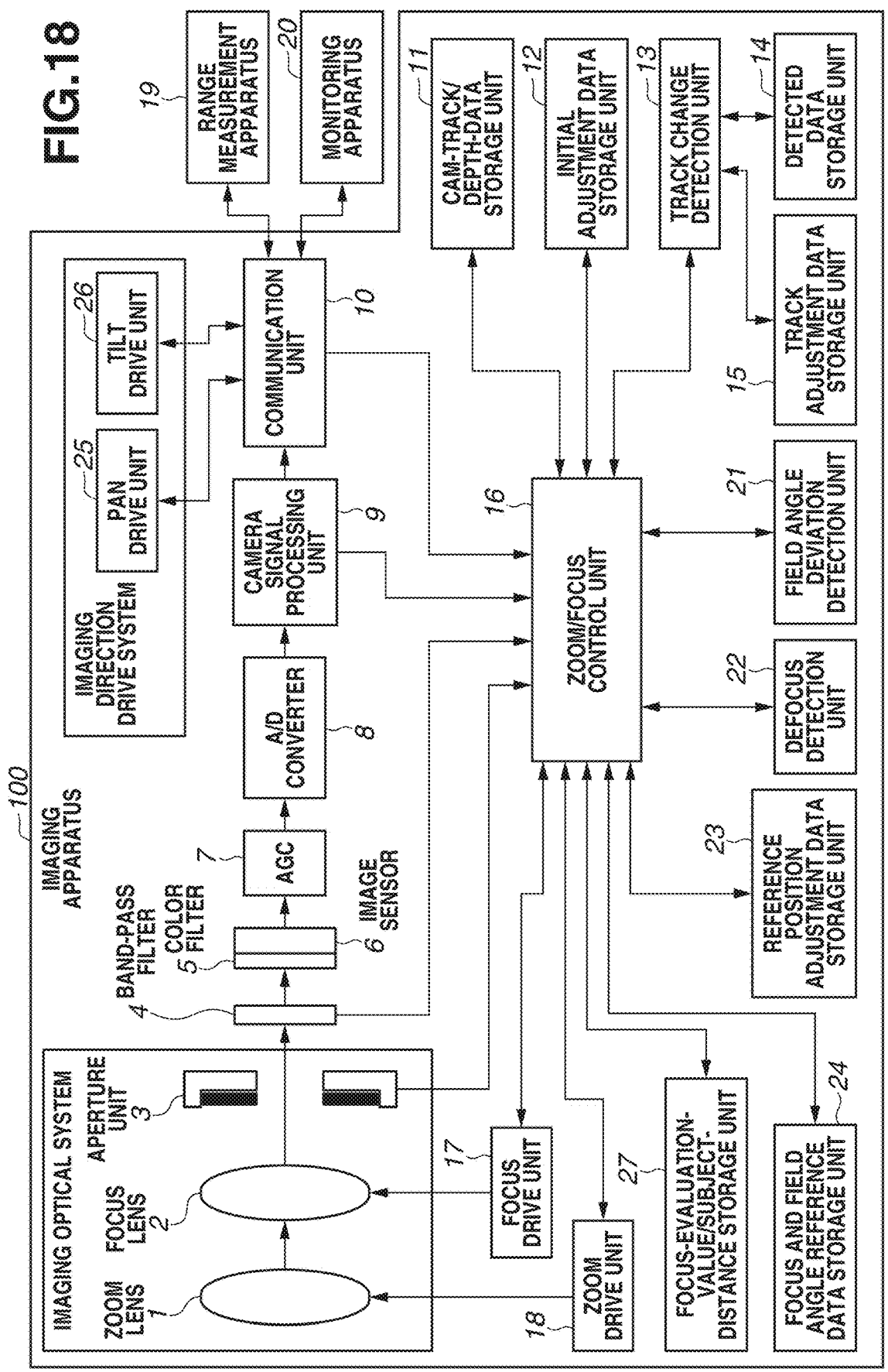
FIG. 18 is a block diagram illustrating a configuration of an imaging apparatus according to a fourth exemplary embodiment of the present invention.

FIG. 18 is a block diagram illustrating a configuration of the imaging apparatus 100 according to the present exemplary embodiment. The imaging apparatus 100 according to the present exemplary embodiment differs from the imaging apparatus 100 according to the second exemplary embodiment in that the imaging apparatus 100 according to the present exemplary embodiment includes a pan drive unit 25, a tilt drive unit 26, and a focus-evaluation-value/subject-distance storage unit 27. Like the cam-track/depth-data storage unit 11 to the focus and field angle reference data storage unit 24, each of these units can be configured by the processor and memory included in the imaging apparatus 100. Each unit will be described below.

The pan drive unit 25 horizontally drives the imaging direction of the imaging apparatus 100 in response to an instruction from the communication unit 10. The tilt drive unit 26 vertically drives the imaging direction of the imaging apparatus 100 in response to an instruction from the communication unit 10. Although, in the present exemplary embodiment, the imaging apparatus 100 includes pan and tilt mechanisms, the imaging apparatus 100 may be configured to be placed on a pan head, and the imaging direction is changed from the outside. To automatically set an imaging range suitable for the adjustment control, the focus-evaluation-value/subject-distance storage unit 27 stores the focus evaluation value corresponding to the pan and tilt positions and the subject distance information when the in-focus state is obtained. Pan and tilt position information is transferred from the communication unit 10 to the zoom/focus control unit 16. The zoom/focus control unit 16 calculates the subject distance in the in-focus state based on the cam track data and stores the calculated subject distance in the focus-evaluation-value/subject-distance storage unit 27.

Figure 19:
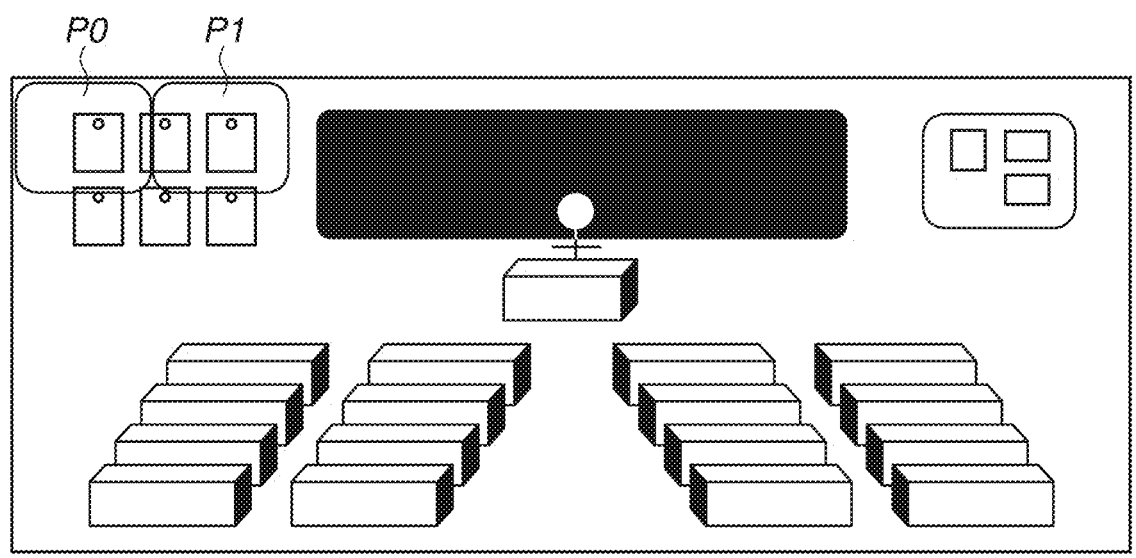
FIG. 19 illustrates an example of automatic field angle setting according to the fourth exemplary embodiment of the present invention.

FIG. 19 is a diagram illustrating an image of the concept of pan and tilt positions when an imaging range is automatically set. The entire image is a kind of a panoramic image formed by combining images captured at the pan and tilt positions. The monitoring apparatus 20 issues a drive instruction to the zoom/focus control unit 16, the pan drive unit 25, and the tilt drive unit 26 via the communication unit 10. Then, a setting is made to capture imaging ranges P0 and P1. FIG. 20 illustrates an example of a data table of the focus evaluation values and the subject distance information in the in-focus state corresponding to the pan and tilt positions stored in the focus-evaluation-value/subject-distance storage unit 27. Referring to FIG. 19, when the in-focus state is obtained in the imaging range P0, the focus evaluation value and the subject distance information calculated based on the cam track data are stored in the position in the column "PAN 0" and the row "TILT 0" in the data table. In panoramic image capturing, image data is stored and combined. According to the present exemplary embodiment, instead of storing images, the focus evaluation value and the subject distance are stored and used to automatically set an imaging range.

A flow of processing in which the imaging apparatus 100 enters the maintenance mode, automatically performs imaging range adjustment control, and performs cam track correction control will be described with reference to FIG. 21. First, in step S2101, the imaging apparatus 100 waits until the user issues an instruction for starting the maintenance mode from the monitoring apparatus 20 to the communication unit 10 (NO in step S2101). When the user issues the instruction for starting the maintenance mode (YES in step S2101), the processing proceeds to step S2102. In step S2102, the communication unit 10 instructs the zoom/focus control unit 16 to drive the zoom lens to the position for the maintenance mode. The zoom lens position at this timing may be determined depending on the configuration of the imaging optical system 110. Alternatively, the zoom lens position when the user operates the imaging apparatus 100 may be utilized. In step S2103, the imaging apparatus 100 automatically adjusts the imaging ranges as described above with reference to FIGS. 19 and 20. The communication unit 10 controls the pan drive unit 25 and the tilt drive unit 26 to generate a data table as illustrated in FIG. 20, and determines the pan and tilt positions having a long subject distance (longer than a predetermined distance) and a high focus evaluation value as the imaging ranges at the time of maintenance. Processing for automatically adjusting an imaging range will be described in more detail below. Although, in this flowchart, the imaging apparatus 100 automatically adjusts the imaging ranges in step S2103 by using the zoom lens position determined in step S2102, this processing may be performed a plurality of times. For example, an imaging range suitable for maintenance can be determined with higher accuracy by automatically adjusting the imaging range at the wide end to determine the provisional imaging range, moving the zoom lens to the telephoto end, and automatically adjusting the imaging range in the provisional imaging range. In step S2104, the imaging apparatus 100 detects cam track changes and estimates a change factor based on the determined field angle. In step S2105, the imaging apparatus 100 corrects cam tracks based on the determined field angle. Then, the processing of the flowchart is terminated. The processing in steps S2104 and S2105 is processing for forcibly executing the flowcharts illustrated in FIGS. 6 and 7 according to the first exemplary embodiment as the maintenance mode, and descriptions of detailed contents will be omitted. The control according to the second exemplary embodiment can be incorporated in addition to the contents in steps S2104 and S2105.

Detailed processing for controlling the automatic imaging range adjustment will be described with reference to FIG. 22. First, in step S2201, the communication unit 10 instructs the pan drive unit 25 and the tilt drive unit 26 to drive the lenses to the initial pan and tilt positions. In this case, for example, the imaging range P0 illustrated in FIG. 19 is set as the initial position. In step S2202, the communication unit 10 issues an instruction to the zoom/focus control unit 16 to start autofocus control. In step S2203, the imaging apparatus 100 waits (NO in step S2203) until the in-focus state is obtained. When the in-focus state is obtained (YES in step S2203), the processing proceeds to step S2204. In step S2204, the zoom/focus control unit 16 stores the focus evaluation value and the subject distance information calculated based on the cam track data, in the data table of the focus-evaluation-value/subject-distance storage unit 27. Since this data table needs to store the values corresponding to the pan and tilt positions, the communication unit 10 control the transfer of the position information for the pan drive unit 25 and the tilt drive unit 26 to the zoom/focus control unit 16. In step S2205, the zoom/focus control unit 16 moves the pan and tilt positions to the next positions. As an example, the zoom/focus control unit 16 drives the lenses to the imaging range P1 illustrated in FIG. 19. In step S2206, the zoom/focus control unit 16 sequentially passes the imaging ranges P0 and then P1 and confirms whether all of the pan and tilt positions are passed. When not all of the pan and tilt positions are passed (NO in step S2206), the processing returns to step S2202. Then, the zoom/focus control unit 16 repeats steps S2206 to S2202. When all of the pan and tilt positions are passed (YES in step S2206), the processing proceeds to step S2207. In step S2207, the zoom/focus control unit 16 determines the pan and tilt positions having a long subject distance and a high focus evaluation value as the most suitable positions. In step S2208, the communication unit 10 issues a drive instruction to the pan drive unit 25 and the tilt drive unit 26 to instruct them to drive the lenses to the most suitable positions determined in step S2207. Then, the processing of the flowchart is terminated.

The present exemplary embodiment enables the user to perform the maintenance to maintain high focusing accuracy even if the actual cam track has changed from the cam track adjusted at the time of factory adjustment caused by shock, vibration, aging, or temperature variations.

A fifth exemplary embodiment will be described centering on an example where the user can execute and set the maintenance mode according to the fourth exemplary embodiment. The configuration of the present exemplary embodiment is similar to that of the fourth exemplary embodiment, and descriptions of duplicated contents will be omitted. Also, for flowcharts having the same contents as those of the fourth exemplary embodiment, redundant descriptions will be omitted.

Figure 23:
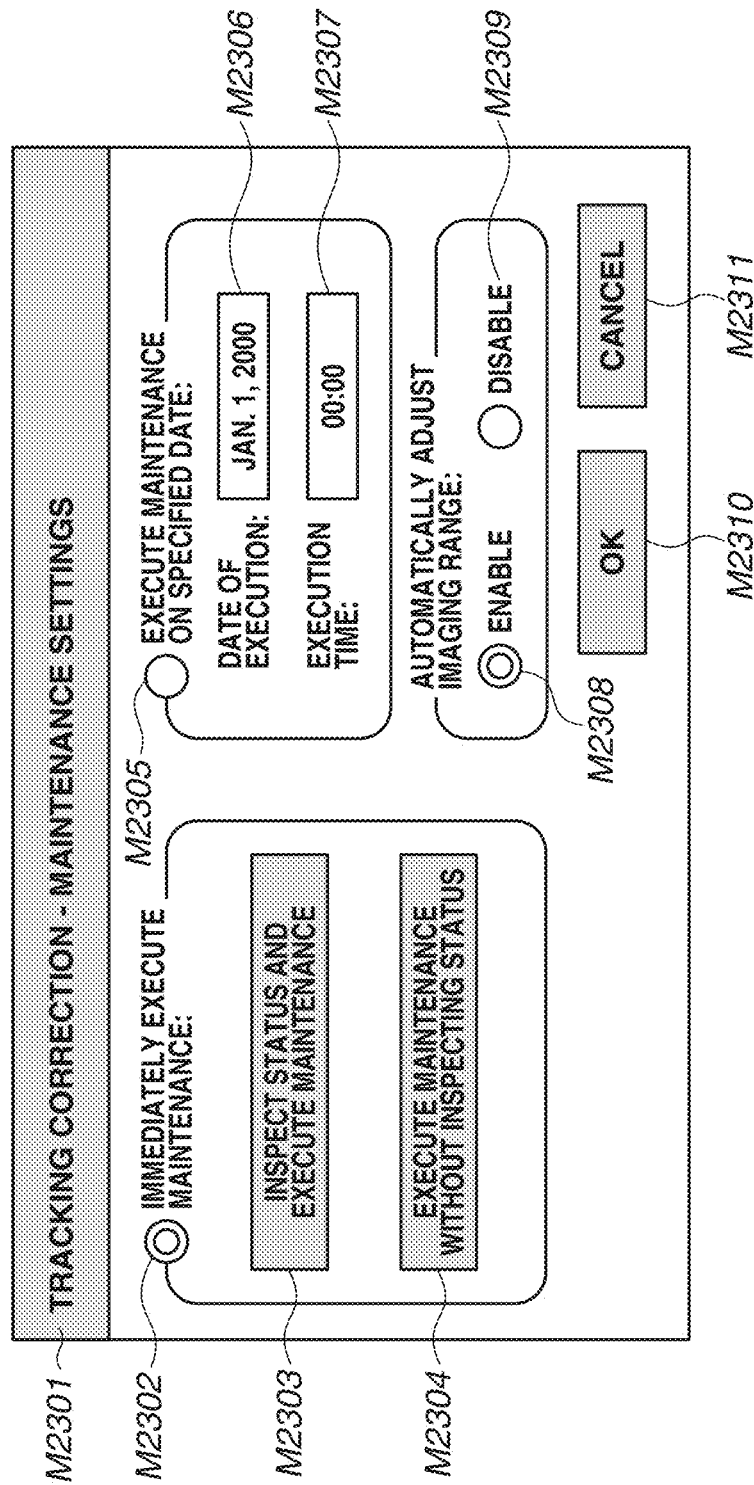
FIG. 23 illustrates an example of a maintenance setting application according to a fifth exemplary embodiment of the present invention.

FIG. 23 illustrates an example of an application screen according to the fifth exemplary embodiment of the present invention. The user can display a maintenance setting application window M2301 and perform operations from the monitoring apparatus 20. The maintenance setting application window M2301 enables the user to execute the maintenance immediately and on the specified date and time. The user can also inspect the status before executing the maintenance, and can select the automatic field angle adjustment to be enabled or disabled.

When "Immediately Execute Maintenance" (item M2302) is selected for maintenance control, the screen provides menu items (buttons) "Inspect Status And Execute Maintenance" (item M2303) and "Execute Maintenance Without Inspecting Status" (item M2304) to enable execution of two different patterns. When the "Inspect Status And Execute Maintenance" button (item M2303) is pressed, the monitoring apparatus 20 transmits an inspection instruction to the communication unit 10, and the communication unit 10 checks the status of the imaging apparatus 100. The contents to be checked in this case include the operation time of the imaging apparatus 100, temperature changes, and the number of times of lens drive. For example, when the operation time is longer than or equal to a predetermined period (e.g., three months), when the temperature inside the imaging apparatus 100 approaches a guaranteed upper-limit temperature several times, or when the number of times of lens drive exceeds $1/10$ of the product durability, the imaging apparatus 100 performs the maintenance control according to the fourth exemplary embodiment if the maintenance has not been performed. Information other than the above-described information may also be utilized depending on the configuration of the imaging apparatus 100. When the maintenance is determined to be unnecessary, the imaging apparatus 100 ends the processing without executing the maintenance. When the "Execute Maintenance Without Inspecting Status" button (item M2304) is pressed, the imaging apparatus 100 executes the maintenance control according to the fourth exemplary embodiment without executing the above-described inspection.

When "Execute Maintenance On Specified Date" button (item M2305) is selected for maintenance control, the maintenance can be performed on the date and time specified by using "Date of Execution" (item M2306) and "Execution Time" (item M2307), respectively. When an "OK button" (item M2310) is pressed with these settings made, the monitoring apparatus 20 transmits the information to the communication unit 10 and then closes the maintenance setting application window M2301. Then, the imaging apparatus 100 performs the maintenance on the specified date and time. When a "Cancel" button (item M2311) is pressed, the monitoring apparatus 20 closes the maintenance setting application window M2301 without transmitting set information to the communication unit 10.

For the automatic imaging range adjustment, the window provides menu items "Enable" (item M2308) and "Disable" (item M2309). Each item will be described below. When "Enable" (item M2308) is selected, the imaging apparatus 100 automatically performs the imaging range adjustment control according to the fourth exemplary embodiment. When "Disable (item M2309) is selected, the imaging apparatus 100 skips the automatic imaging range adjustment control. This setting is reflected to the control of "Immediately Execute Maintenance" (item M2302) and "Execute Maintenance On Specified Date" (item M2305).

The present exemplary embodiment enables the user to perform the maintenance at an arbitrary timing to maintain high focusing accuracy even if the actual cam track has changed from the cam track adjusted at the time of factory adjustment caused by shock, vibration, aging, or temperature variations.

While the present invention has specifically been described based on the above-described exemplary embodiments, the present invention is not limited thereto, naturally, and can be modified and changed in diverse ways within the ambit of the appended claims.

In the first to the fifth exemplary embodiments, examples have been described where the present invention is applied to a lens-integrated imaging apparatus having an imaging optical system (imaging lenses) integrated with the main body of the imaging apparatus. However, the present invention is not limited thereto, and applicable also to imaging systems (optical apparatuses) including the main body of an imaging apparatus and an interchangeable lens having an imaging optical system attachable to and detachable from the main body of the imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-034281, filed Feb. 27, 2019, and No. 2020-008774, filed Jan. 22, 2020, which are hereby incorporated by reference herein in their entirety.

What is claimed is:

1. An imaging apparatus comprising:
an image sensor configured to photoelectrically convert a subject image obtained through an imaging optical system including a zoom lens and a focus lens;
at least one processor; and
a memory that is coupled to the at least one processor and stores one or more computer-readable instructions, wherein the computer-readable instructions cause, when executed by the at least one processor, the at least one processor to function as:
a storage unit configured to store track data indicating a positional relationship between the zoom and the focus lenses when the imaging optical system focuses at a predetermined subject distance;
an adjustment value acquisition unit configured to acquire adjustment values for adjusting the track data; and
a focus control unit configured to control a drive of the focus lens based on the track data and the adjustment values acquired by the adjustment value acquisition unit at the time of a zoom operation,
wherein the adjustment value acquisition unit selects adjustment value acquisition processing to be performed from a plurality of pieces of adjustment value acquisition processing based on the track data, the zoom lens position, and the focus lens position, and acquires adjustment values based on the selected adjustment value acquisition processing.

2. The imaging apparatus according to claim 1, wherein the adjustment value acquisition unit selects the adjustment value acquisition processing based on an in-focus level of the imaging optical system when the zoom and the focus lenses take a first position and the track data.

3. The imaging apparatus according to claim 2, wherein the adjustment value acquisition unit selects the adjustment value acquisition processing based on the in-focus level of the imaging optical system when the zoom and the focus lenses take the first position, the in-focus level of the imaging optical system when the zoom and the focus lenses take a second position different from the first position, and the track data.

4. The imaging apparatus according to claim 2, wherein the adjustment value acquisition unit selects the adjustment value acquisition processing based on the in-focus level of the imaging optical system when the zoom and the focus lens positions indicate the in-focus position of the imaging optical system in the track data.

5. The imaging apparatus according to claim 1, wherein the adjustment value acquisition unit acquires the in-focus level when the zoom lens is driven in the wide end direction from the in-focus state of the zoom lens with a predetermined magnification or larger, and stores the in-focus level as detection data.

6. The imaging apparatus according to claim 1, wherein the instructions further causing the at least one processors to function as:
a distance information acquisition unit configured to acquire first distance information,
wherein the adjustment value acquisition unit compares second distance information acquired based on the zoom lens and focus lens positions and the track data on an assumption that the imaging optical system is in the in-focus state with the first distance information acquired by the distance information acquisition unit, and selects the adjustment value acquisition processing based on a difference between the first distance information and the second distance information.

7. The imaging apparatus according to claim 1, wherein the plurality of pieces of adjustment value acquisition processing includes first adjustment value acquisition processing and second adjustment value acquisition processing, and
wherein the second adjustment values acquisition processing provides smaller changes in the adjustment value corresponding to the zoom lens position than the first adjustment value acquisition processing.

8. The imaging apparatus according to claim 7, wherein the second adjustment value acquisition processing is processing for acquiring an offset value of the track data, and
wherein the offset value is acquired as the adjustment values.

9. The imaging apparatus according to claim 1, wherein the instructions further cause the at least one processors to function as:
a reference position adjustment unit configured to adjust reference positions of the zoom and the focus lenses,
wherein the reference position adjustment unit acquires an adjustment value for adjusting a zoom lens reference position based on a difference between a field angle indicated by prestored reference field angle information and a current field angle, and adjusts the focus lens reference position based on a difference between an in-focus position indicated by a reference in-focus information and a current in-focus position.

10. The imaging apparatus according to claim 9, wherein the reference position adjustment unit adjusts the focus lens reference position after adjusting the zoom lens reference position.

11. The imaging apparatus according to claim 8, wherein the instructions further cause the at least one processors to function as:
a distance information acquisition unit configured to acquire distance information; and
a reference position adjustment unit configured to adjust reference positions of the zoom and the focus lenses,
wherein the reference position adjustment unit is configured to acquire adjustment values for adjusting the zoom lens reference position based on a difference between a field angle indicated by prestored reference field angle information and a current field angle, and to adjust the focus lens reference position based on the adjustment values, and
wherein the distance information acquisition unit calculates, in a case where distance information at a timing of acquiring the reference in-focus information and the reference field angle information coincides with current distance information, a zoom deviation amount from the reference field angle information and a focus deviation amount from the reference in-focus information.

12. The imaging apparatus according to claim 1, wherein the storage unit stores track information before an initial adjustment and an initial adjustment values, and wherein the focus control unit controls the focus lens based on the track information before the initial adjustment, the initial adjustment values, and the adjustment values acquired by the adjustment value acquisition unit.

13. The imaging apparatus according to claim 1,
wherein the imaging apparatus has a first mode for performing image capturing, and a second mode for performing maintenance based on an instruction from a user,
wherein the adjustment value acquisition unit automatically acquires the adjustment values in the first mode; and
wherein the adjustment value acquisition unit acquires the adjustment values at a timing based on the instruction from the user in the second mode.

14. The imaging apparatus according to claim 13, wherein the instructions further cause the at least one processor to function as:
an imaging range changing unit configured to change an imaging range by controlling the imaging optical system;
a storage unit configured to store a focus evaluation value and a subject distance in the in-focus state corresponding to the imaging range; and
an imaging range determination unit configured to determine the imaging range based on the stored focus evaluation value and subject distance in the second mode,
wherein the adjustment value acquisition unit acquires the adjustment values in the imaging range determined by the imaging range determination unit.

15. The imaging apparatus according to claim 13, wherein the instructions further cause the at least one process to function as a unit configured to select a method for controlling the second mode,
wherein the unit selects any one of a method for acquiring the adjustment values after determining whether the acquisition of the adjustment values is necessary, a method for acquiring the adjustment values without determining whether the acquisition of the adjustment values is necessary, and a method for acquiring the adjustment values on a date and time specified for the acquisition of the adjustment values.

16. The imaging apparatus according to claim 15,
wherein the determination whether the acquisition of the adjustment values is necessary by comparing at least any one of an operation time of the imaging apparatus, temperature variations, and the number of times of lens drive with a predetermined value, and
wherein it is determined that the acquisition of the adjustment values is necessary in a case where the compared value is larger than or equal to the predetermined value.

17. The imaging apparatus according to claim 14, wherein the instructions further cause the at least one processor to function as a range control selection unit configured to select a control method for controlling the imaging range,
wherein the range control selection unit enables selecting any one of a control method for adjusting the imaging range before the acquisition of the adjustment value and a control method for not adjusting the imaging range before the acquisition of the adjustment values.

18. A method for controlling an imaging apparatus comprising an image sensor configured to photoelectrically convert a subject image captured through an imaging optical system including a zoom lens and a focus lens, the method comprising:
acquiring adjustment values for adjusting track data indicating a positional relationship between the zoom and the focus lenses when the imaging optical system focuses at a predetermined subject distance; and
controlling a drive of the focus lens based on the track data and the acquired adjustment values at a time of a zoom operation,
wherein, in the acquiring, selecting adjustment value acquisition processing to be performed from a plurality of pieces of adjustment value acquisition processing based on the track data, the zoom lens position, and the focus lens position; and
wherein adjustment values are acquired based on the selected adjustment value acquisition processing.

* * * * *